United States Patent
Jia et al.

(10) Patent No.: US 8,902,894 B2
(45) Date of Patent: Dec. 2, 2014

(54) APPARATUS AND METHODS FOR WIRELESS COMMUNICATION USING A PACKET STRUCTURE THAT INDICATES WHETHER PAYLOAD LENGTH FIELD AND PAYLOAD ARE INCLUDED IN THE PACKET

(75) Inventors: Zhanfeng Jia, Belmont, CA (US); David Jonathan Julian, San Diego, CA (US); Qingjiang Tian, San Diego, CA (US); Amal Ekbal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 619 days.

(21) Appl. No.: 13/161,648

(22) Filed: Jun. 16, 2011

(65) Prior Publication Data

US 2012/0281699 A1    Nov. 8, 2012

Related U.S. Application Data

(60) Provisional application No. 61/483,307, filed on May 6, 2011, provisional application No. 61/486,187, filed on May 13, 2011.

(51) Int. Cl.
| | |
|---|---|
| *H04L 12/28* | (2006.01) |
| *H04L 12/56* | (2006.01) |
| *H04W 28/06* | (2009.01) |
| *H04W 8/00* | (2009.01) |
| *H04L 29/06* | (2006.01) |
| *H04W 84/18* | (2009.01) |
| *H04W 76/02* | (2009.01) |

(52) U.S. Cl.
CPC .............. *H04W 28/06* (2013.01); *H04W 8/005* (2013.01); *H04L 69/22* (2013.01); *H04W 84/18* (2013.01); *H04W 76/023* (2013.01)
USPC ........................... 370/392; 370/310; 370/389

(58) Field of Classification Search
None
See application file for complete search history.

(56) References Cited

U.S. PATENT DOCUMENTS

| | | | | |
|---|---|---|---|---|
| 5,442,344 | A * | 8/1995 | Merkle et al. ................. | 705/22 |
| 6,044,121 | A * | 3/2000 | Nolan et al. ................ | 375/354 |
| 6,442,145 | B1 * | 8/2002 | De Lange et al. ............ | 370/310 |
| 6,665,313 | B1 * | 12/2003 | Chang et al. ................ | 370/469 |

(Continued)

FOREIGN PATENT DOCUMENTS

| | | |
|---|---|---|
| EP | 1986363 A1 | 10/2008 |
| WO | 2005006599 A1 | 1/2005 |

OTHER PUBLICATIONS

International Search Report and Written Opinion—PCT/US2012/036649—ISA/EPO—Oct. 5, 2012.

(Continued)

*Primary Examiner* — Ayaz Sheikh
*Assistant Examiner* — Peter Chau
(74) *Attorney, Agent, or Firm* — Paul S. Holdaway

(57) ABSTRACT

In accordance with aspects of the disclosure, a method, apparatus, and computer program product are provided for wireless communication. The method, apparatus, and computer program product may be configured to generate packets, wherein each of the packets comprises a packet header comprising a packet format field comprising a first indicator that indicates whether the packet header comprises a payload length field and whether the packet comprises a payload. The method, apparatus, and computer program product may be further configured to generate a second indicator based on a type of data in the payload, and attach the second indicator to the data.

46 Claims, 20 Drawing Sheets

(56) References Cited

U.S. PATENT DOCUMENTS

| | | | |
|---|---|---|---|
| 8,416,803 B1* | 4/2013 | Basson et al. | 370/465 |
| 2003/0066015 A1* | 4/2003 | Sehier | 714/774 |
| 2004/0017823 A1* | 1/2004 | Kim et al. | 370/466 |
| 2004/0120424 A1* | 6/2004 | Roberts | 375/327 |
| 2004/0215848 A1* | 10/2004 | Craddock et al. | 710/39 |
| 2005/0058078 A1* | 3/2005 | Jung et al. | 370/241 |
| 2007/0014251 A1* | 1/2007 | Jabri et al. | 370/310 |
| 2007/0160012 A1* | 7/2007 | Liu | 370/334 |
| 2007/0297352 A1* | 12/2007 | Jabri et al. | 370/261 |
| 2008/0013542 A1* | 1/2008 | Youm et al. | 370/395.3 |
| 2008/0259896 A1* | 10/2008 | Sahinoglu et al. | 370/345 |
| 2008/0267281 A1* | 10/2008 | Costantini et al. | 375/240 |
| 2009/0323602 A1* | 12/2009 | Li et al. | 370/329 |
| 2010/0061272 A1* | 3/2010 | Veillette | 370/254 |

OTHER PUBLICATIONS

ITU-T Telecommunication Standardization Sector of ITU, "ITU-T Recomnendation G.7041/Y. 1303 (Aug. 2005): Generic framing procedure (GFP)", ITU-T Recommendation G.7041/Y.1303, XX, XX, Aug. 1, 2005, pp. 1-57, XP002363710.

* cited by examiner

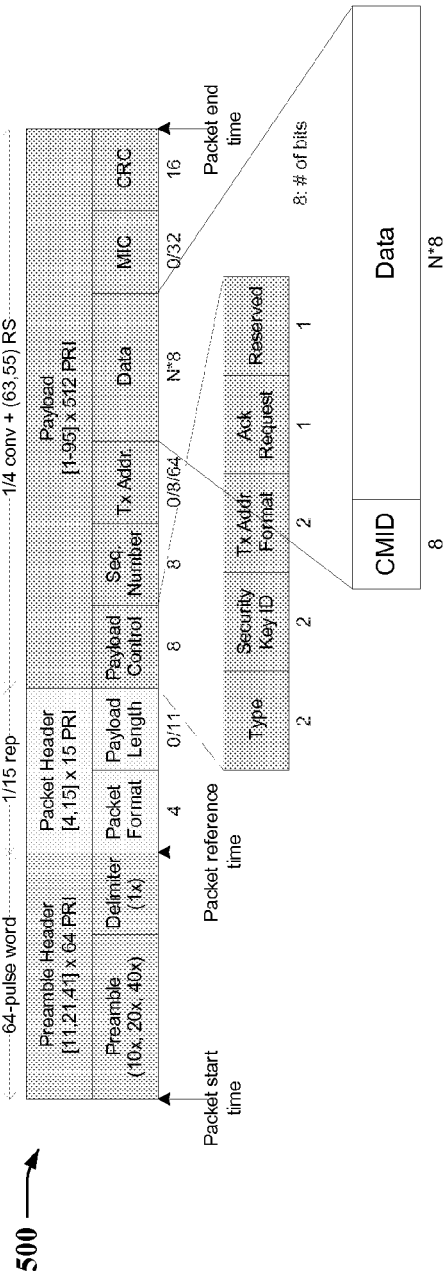
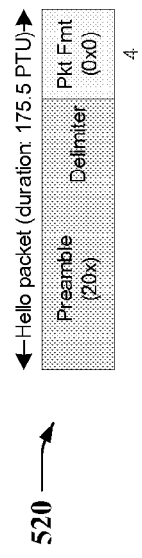
FIG. 5A
FIG. 5C

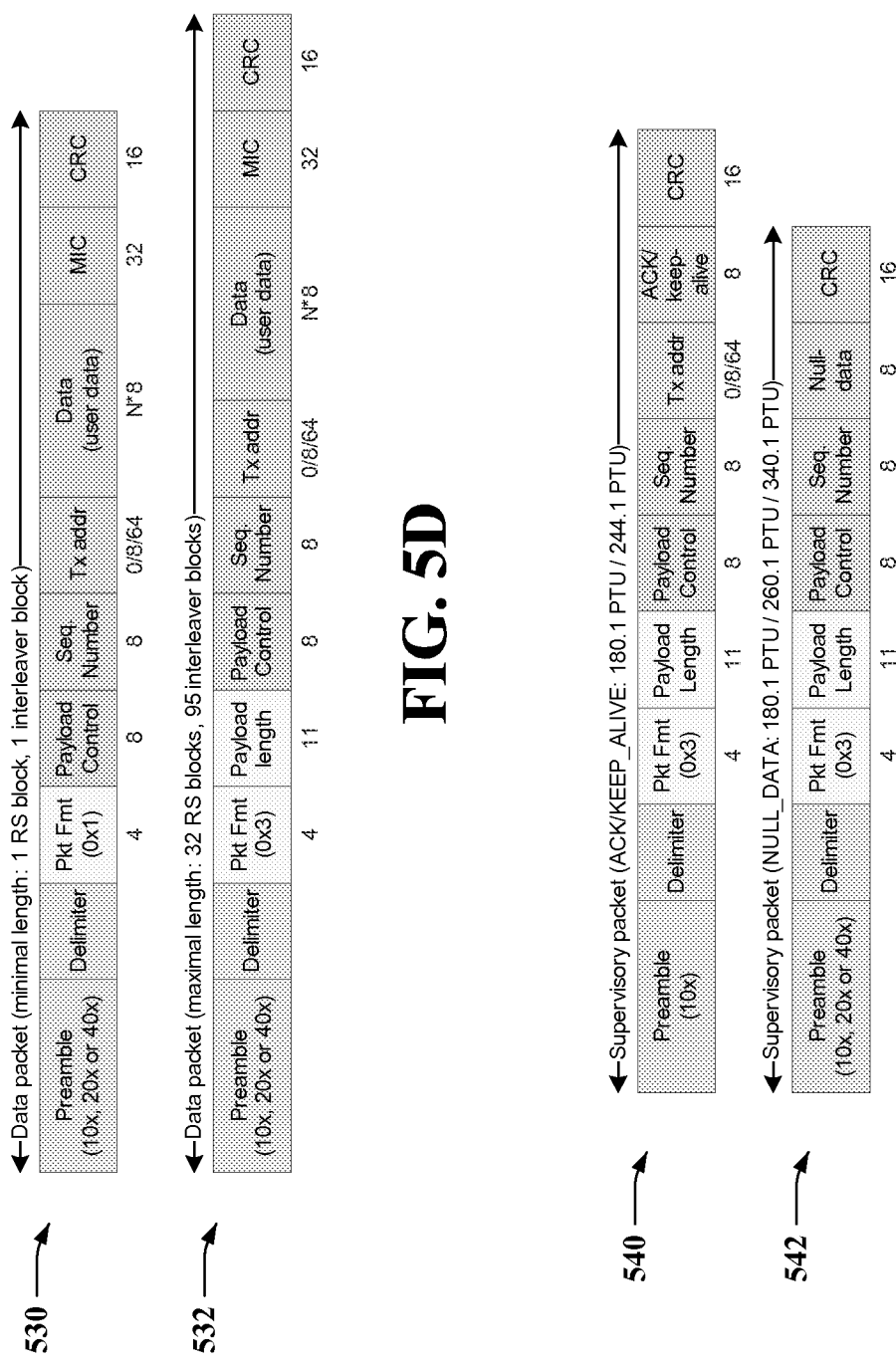

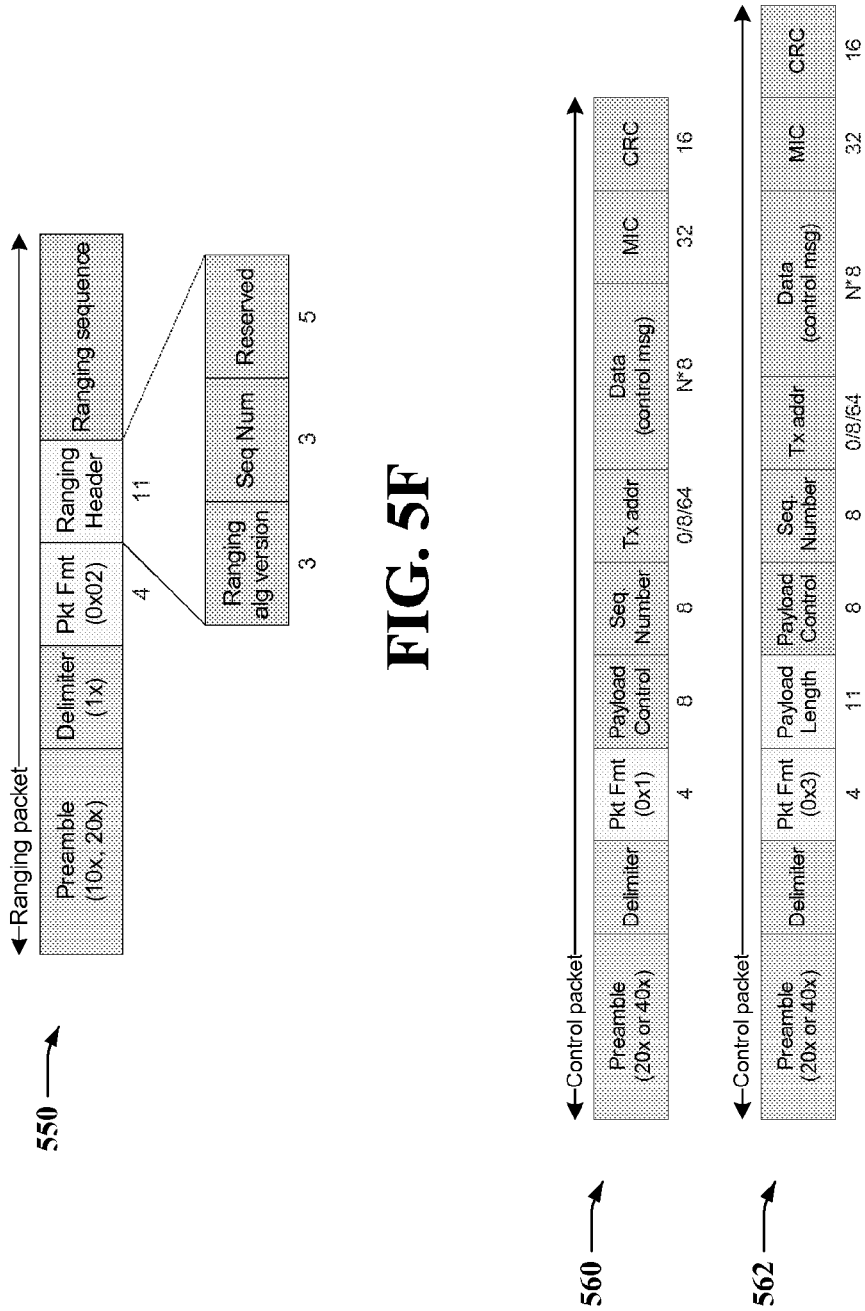

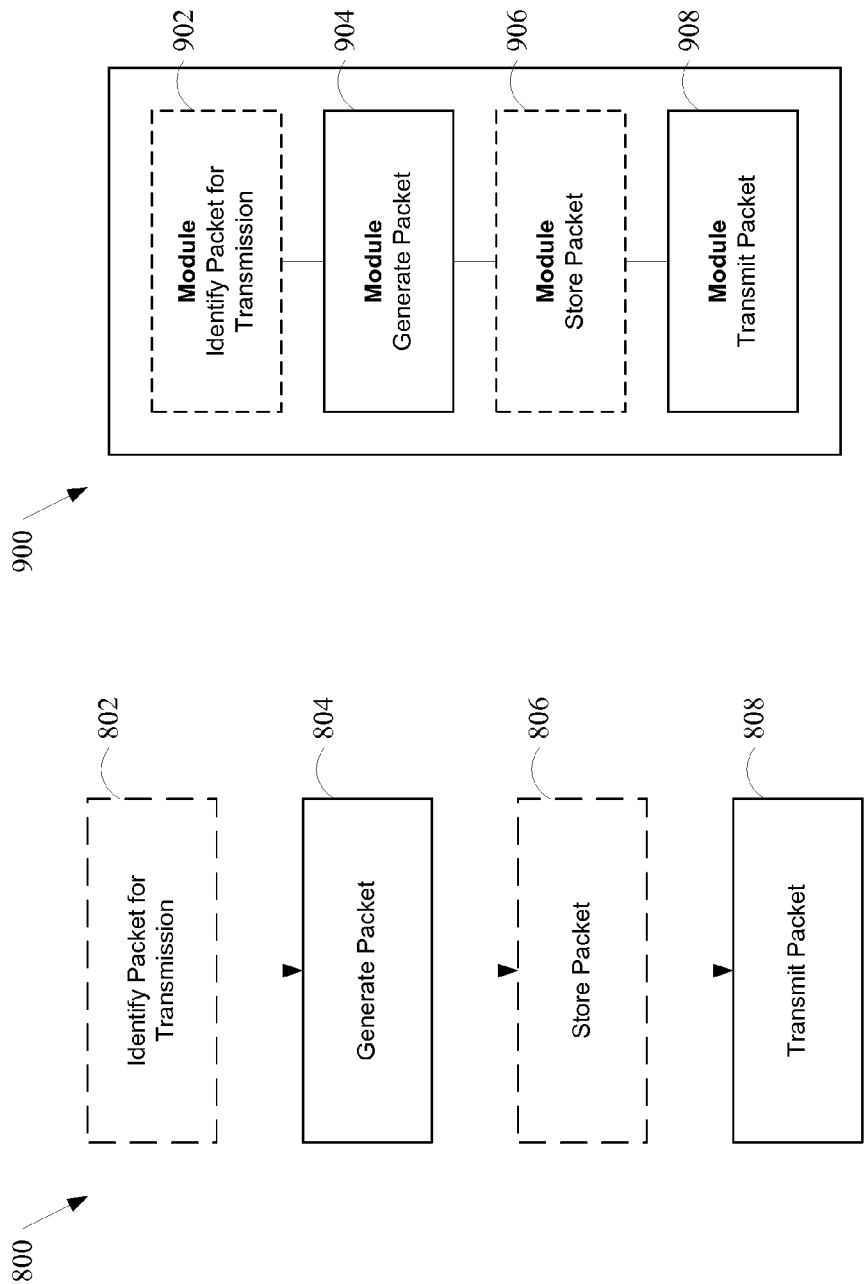

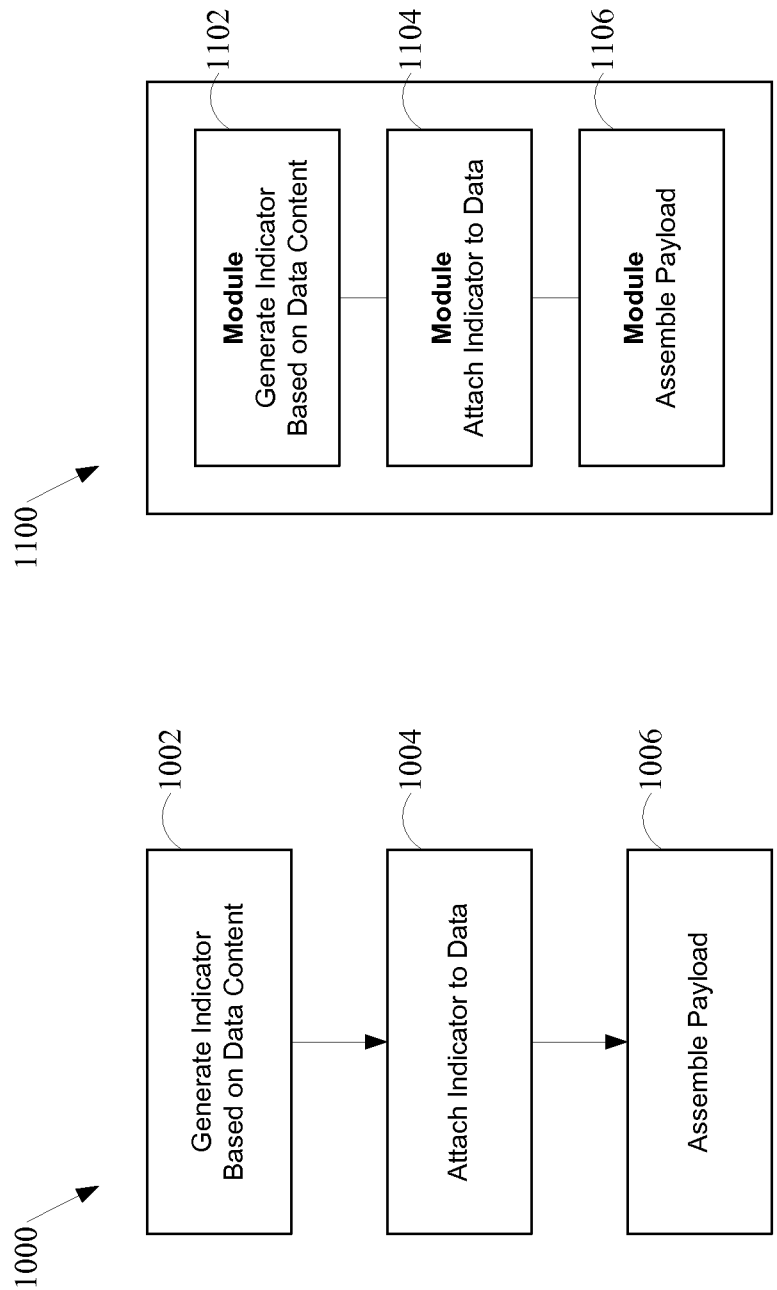

APPARATUS AND METHODS FOR WIRELESS COMMUNICATION USING A PACKET STRUCTURE THAT INDICATES WHETHER PAYLOAD LENGTH FIELD AND PAYLOAD ARE INCLUDED IN THE PACKET

CROSS-REFERENCE TO RELATED APPLICATION(S)

This application claims priority to and benefit of U.S. Provisional Application Ser. No. 61/483,307, entitled "Apparatus and Methods for Wireless Communication using a Packet Structure," filed on May 6, 2011, which is expressly incorporated by reference herein in its entirety.

This application also claims priority to and benefit of U.S. Provisional Application Ser. No. 61/486,187, entitled "Apparatus and Methods for Wireless Communication Using a Packet Structure with Channel Management Protocol," filed on May 13, 2011, which is expressly incorporated by reference herein in its entirety.

BACKGROUND

1. Field

The present disclosure relates generally to communication systems, and more particularly, to an apparatus and methods for wireless communication using a packet structure in a wireless communication network.

2. Background

In a wireless wide area network, communication between wireless devices and a serving base station typically occur through the uplink/downlink channels between the wireless devices and the base station. Further, when two wireless devices are attempting to communicate with each other, they must still rely on the serving base station to pass the communications between them. However, it would be advantageous if two communicating wireless devices that are in vicinity of each other can communicate directly without going through the base station. Such direct peer-to-peer communication can enable new types of services and/or reduce the traffic load on the base station.

SUMMARY

In an aspect of the disclosure, an apparatus for wireless communication comprises a packet generator configured to generate packets, wherein each of the packets comprises a packet header comprising a packet format field comprising a first indicator that indicates whether the packet header comprises a payload length field and whether the packet comprises a payload, and a transmitter configured to transmit each of the packets. The packet generator may be further configured to generate a second indicator based on a type of data in the payload, and attach the second indicator to the data.

In an aspect of the disclosure, a method for wireless communication comprises generating packets, wherein each of the packets comprises a packet header comprising a packet format field comprising a first indicator that indicates whether the packet header comprises a payload length field and whether the packet comprises a payload, and transmitting each of the packets. The method may further comprise generating a second indicator based on a type of data in the payload, attaching the second indicator to the data, and assembling the payload.

In an aspect of the disclosure, an apparatus for wireless communication comprises means for generating packets, wherein each of the packets comprises a packet header comprising a packet format field comprising a first indicator that indicates whether the packet header comprises a payload length field and whether the packet comprises a payload, and means for transmitting each of the packets. The apparatus may further comprise means for generating a second indicator based on a type of data in the payload, means for attaching the second indicator to the data, and means for assembling the payload.

In an aspect of the disclosure, a computer program product comprises a computer-readable medium comprising code executable by an apparatus to generate packets, wherein each of the packets comprises a packet header comprising a packet format field comprising a first indicator that indicates whether the packet header comprises a payload length field and whether the packet comprises a payload, and transmit each of the packets. The computer-readable medium may further comprise code executable by the apparatus to generate a second indicator based on a type of data in the payload, and attach the second indicator to the data.

In an aspect of the disclosure, a mobile communication device comprises a packet generator configured to generate packets, wherein each of the packets comprises a packet header comprising a packet format field comprising a first indicator that indicates whether the packet header comprises a payload length field and whether the packet comprises a payload, an antenna, and a transmitter configured to transmit each of the packets through the antenna. The packet generator may be further configured to generate a second indicator based on a type of data in the payload, and attach the second indicator to the data.

BRIEF DESCRIPTION OF THE DRAWINGS

FIG. 5A shows a diagram for illustrating an example of a variable length packet structure for peer-to-peer communication in a mesh based network that may be utilized in the disclosed system, in accordance with aspects of the disclosure.

FIGS. 5C-5G show various diagrams for illustrating example variable length packet types including packet structure that may be utilized in the disclosed system.

FIG. 8 is flow chart of a method for wireless communication, in accordance with aspects of the disclosure.

FIG. 9 is a diagram illustrating functionality of an apparatus for performing methods for wireless communication, in accordance with aspects of the disclosure.

FIG. 10 is flow chart of a method for wireless communication, in accordance with aspects of the disclosure.

FIG. 11 is a diagram illustrating functionality of an apparatus for performing methods for wireless communication, in accordance with aspects of the disclosure.

DETAILED DESCRIPTION

Figure 1:
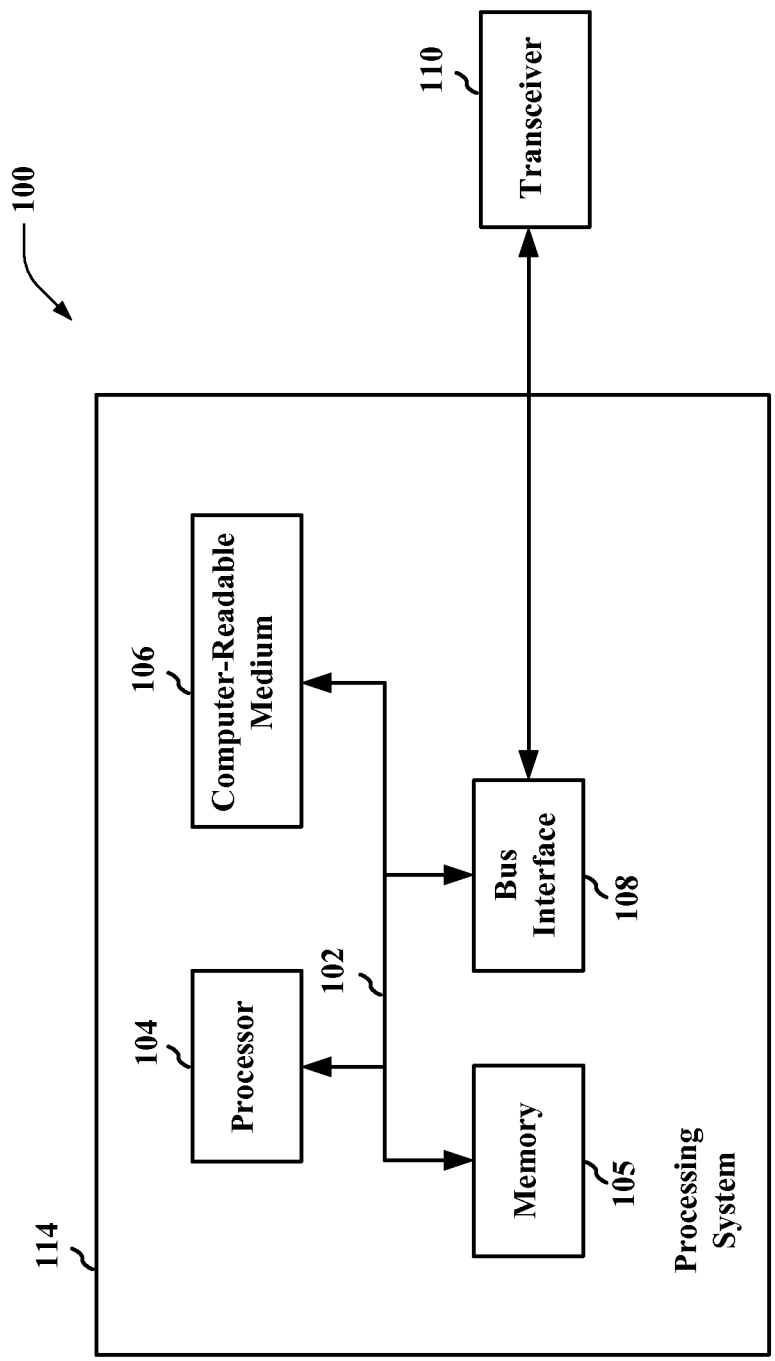
FIG. 1 shows a diagram illustrating a hardware implementation for an apparatus employing a processing system, in accordance with aspects of the disclosure.
Figure 2:
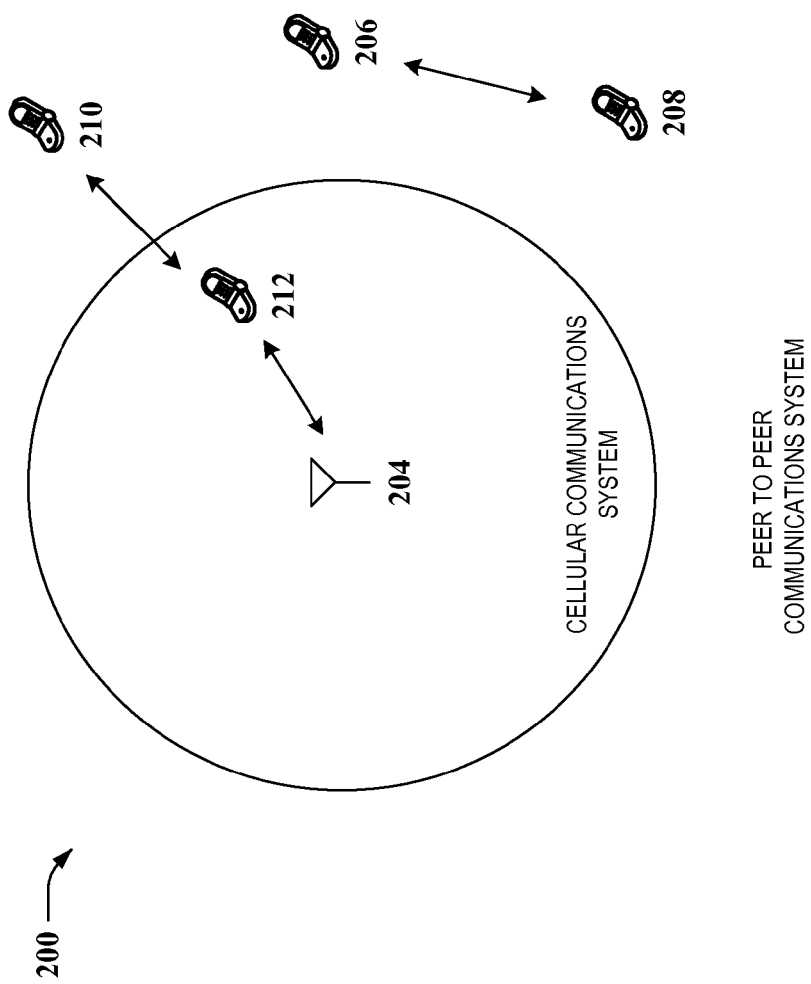
FIG. 2 shows a diagram of a wireless communications system, in accordance with aspects of the disclosure.
Figure 3A:
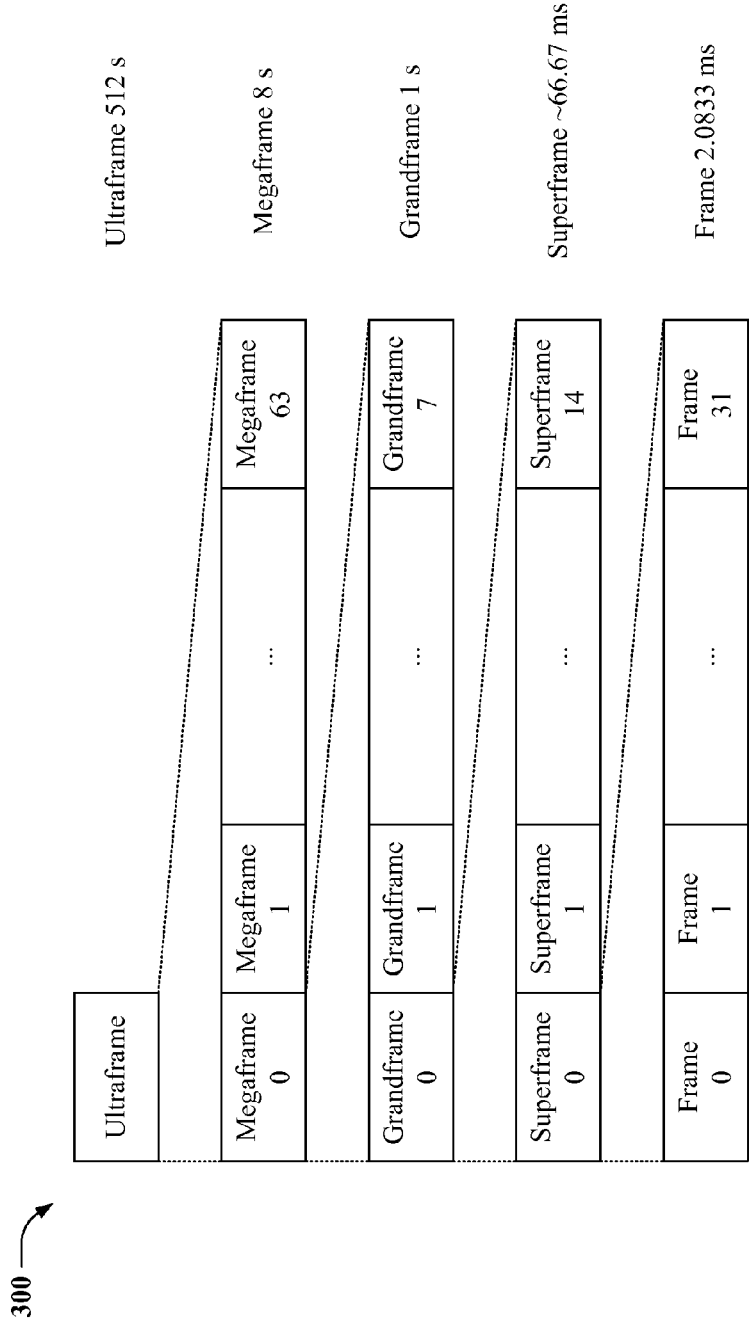
FIG. 3A shows a diagram illustrating a time structure for communication between wireless devices that may be utilized in a wireless communication system, in accordance with aspects of the disclosure.
Figure 3B:
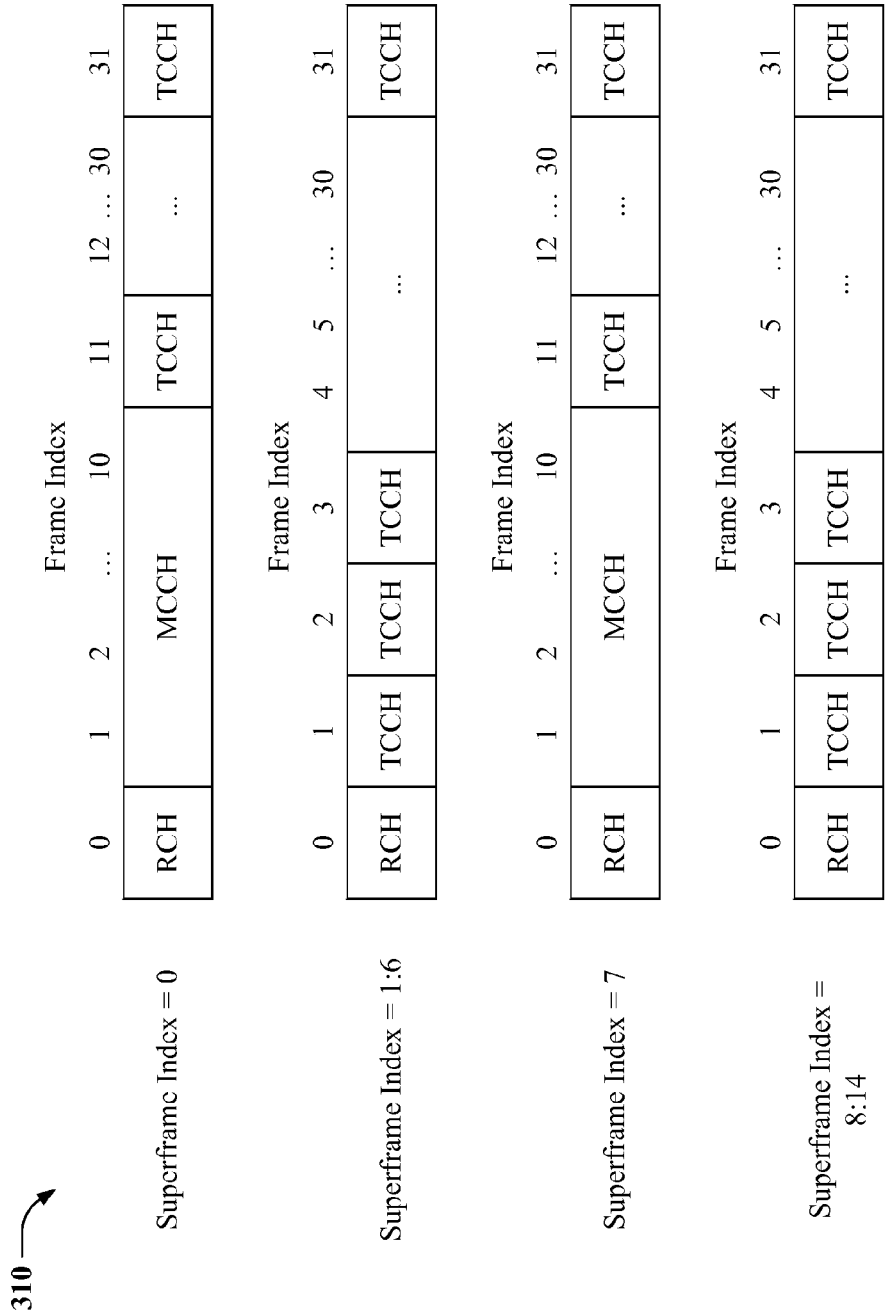
FIG. 3B shows a diagram illustrating channels in each frame of superframes in one grandframe, in accordance with aspects of the disclosure.
Figure 3C:
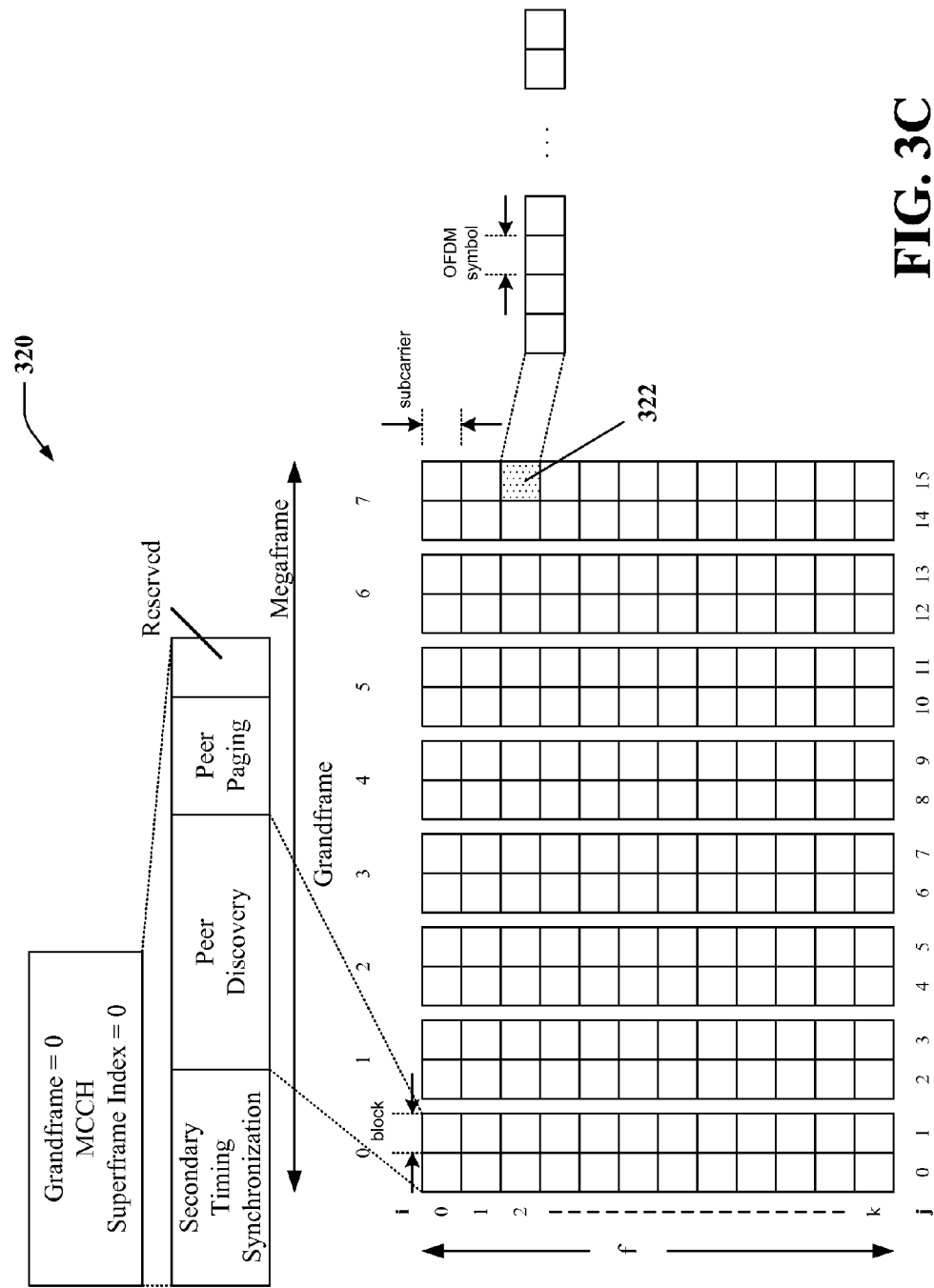
FIG. 3C shows a diagram illustrating an operation timeline of a miscellaneous channel and a structure of a peer discovery channel.
Figure 3D:
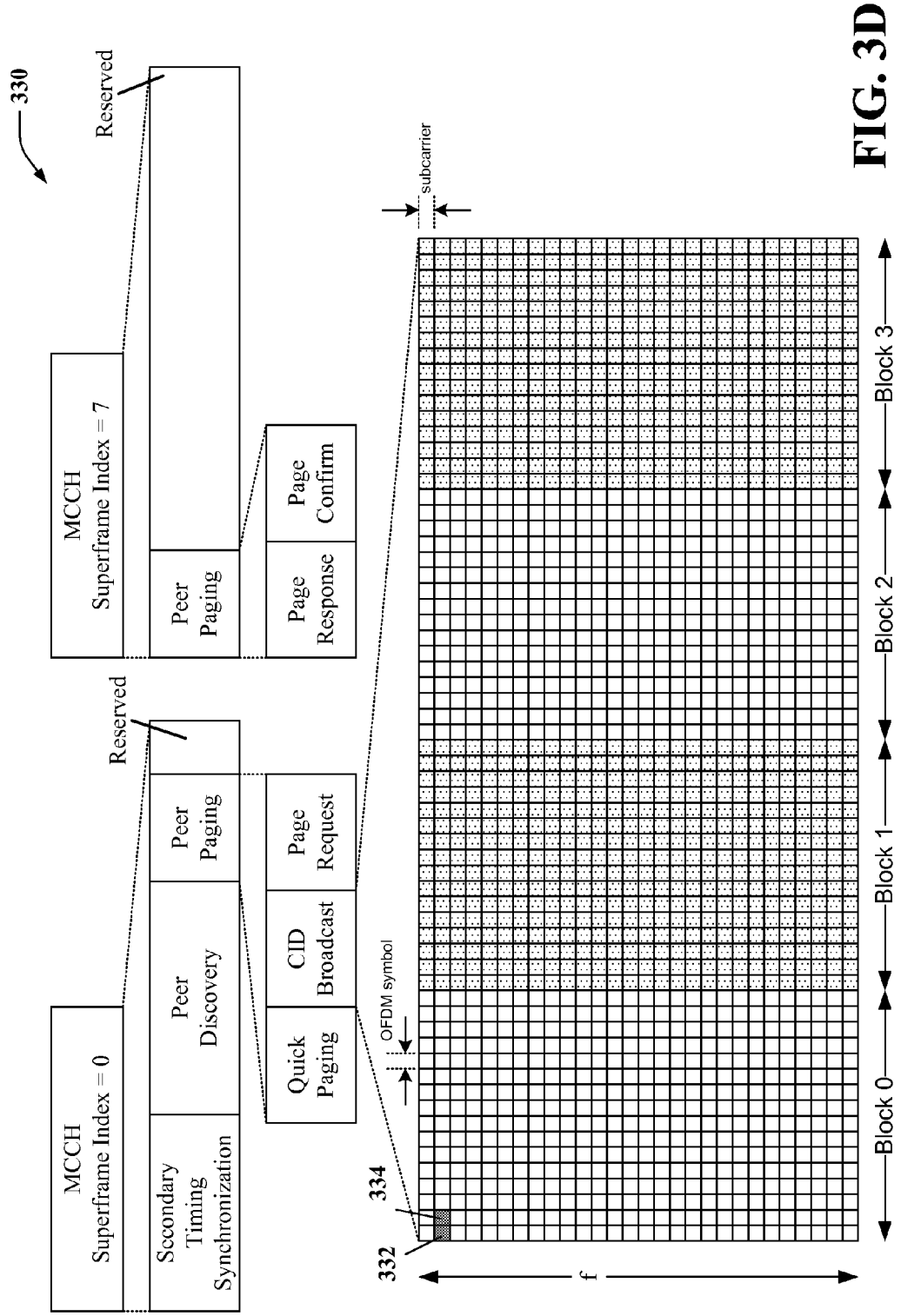
FIG. 3D shows a diagram illustrating an operation timeline of a channel, in accordance with aspects of the disclosure.
Figure 3E:
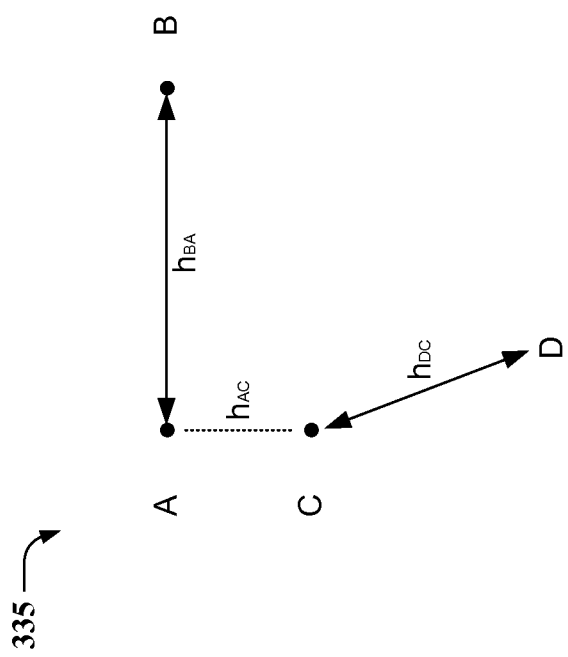
FIG. 3E shows a diagram for illustrating the selection of a new connection identifier, in accordance with aspects of the disclosure.
Figure 3F:
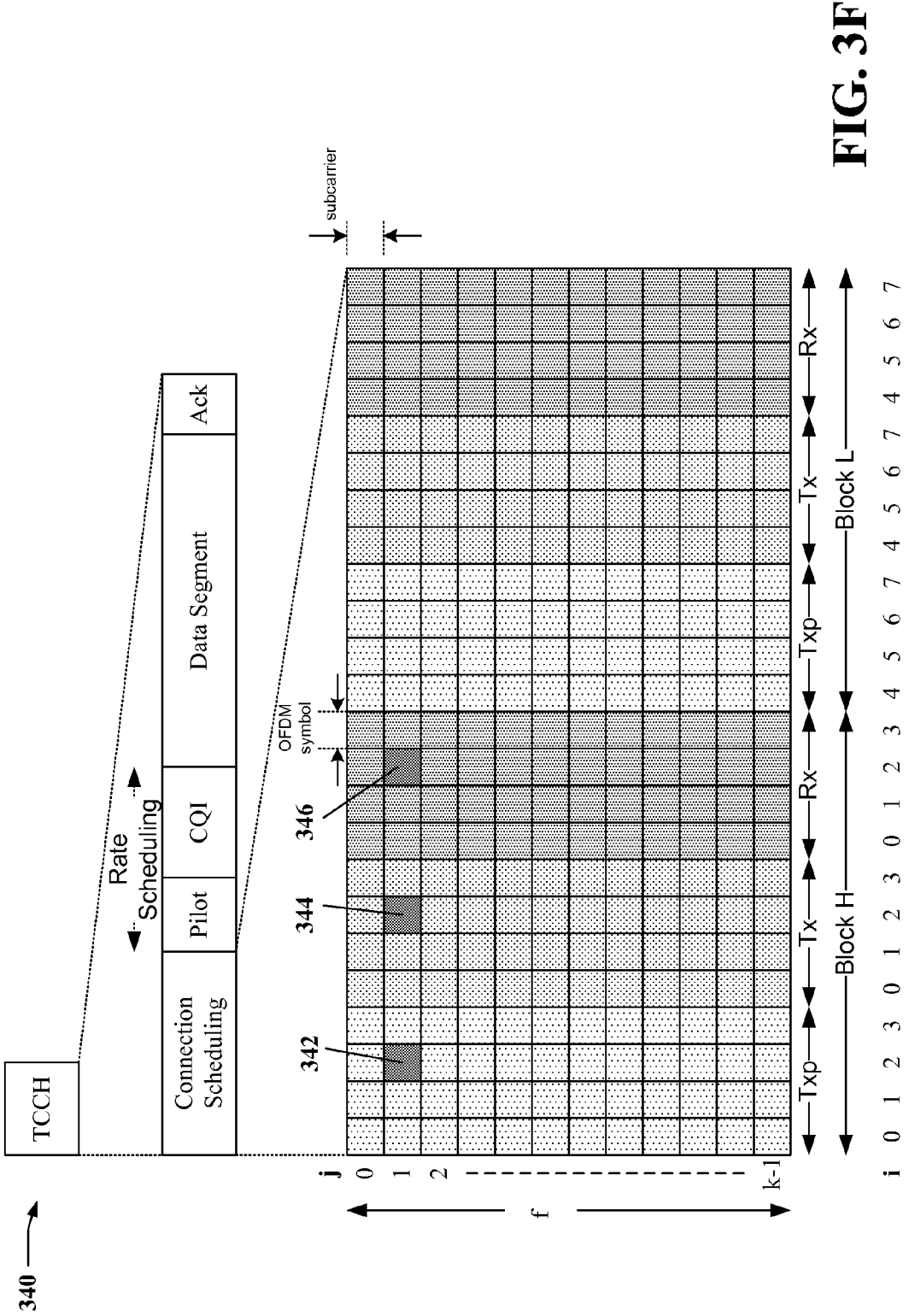
FIG. 3F shows a diagram illustrating an operation timeline of a traffic channel slot and a structure of connection scheduling, in accordance with aspects of the disclosure.
Figure 3G:
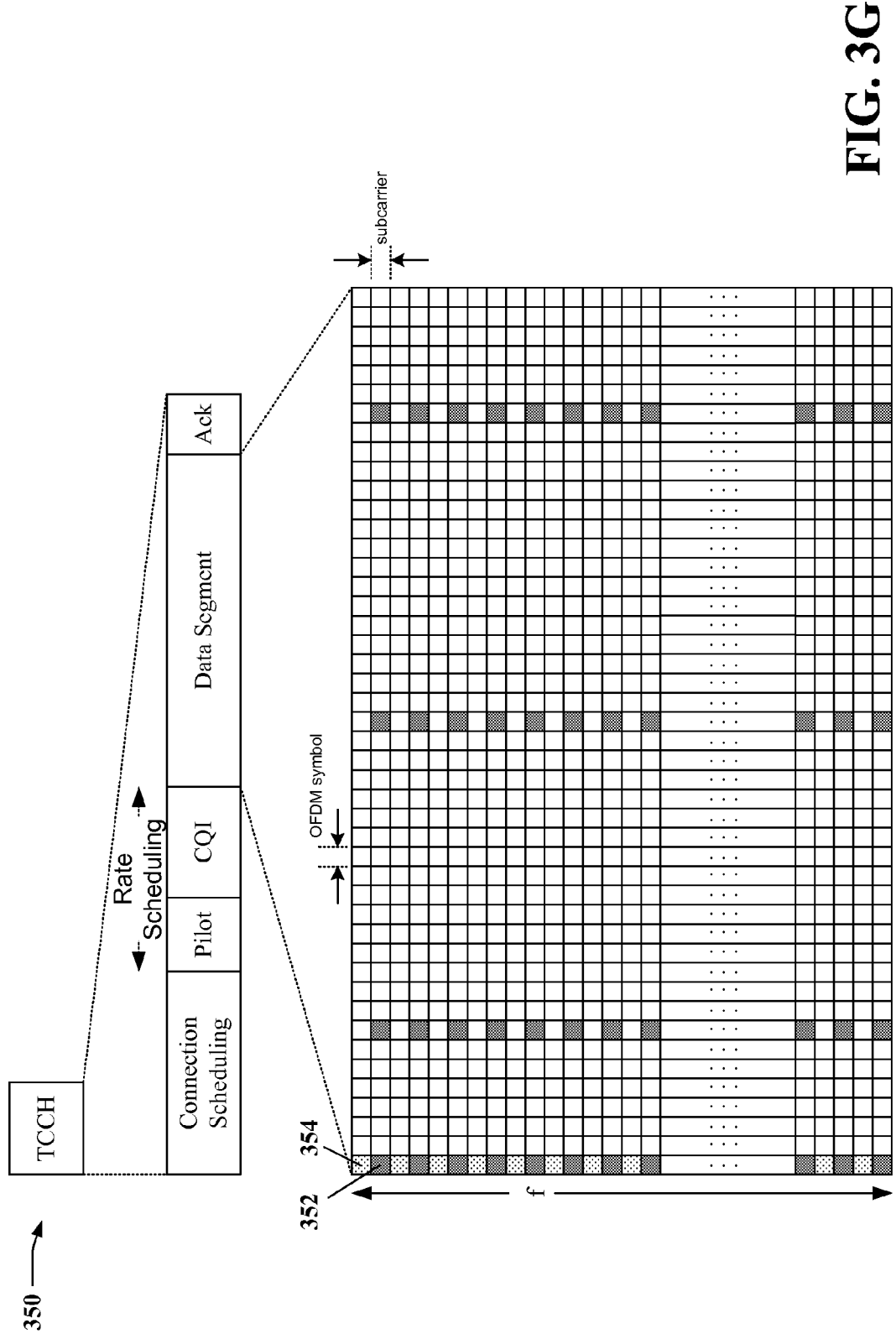
FIG. 3G shows a diagram illustrating a structure of a data segment, in accordance with aspects of the disclosure.
Figure 3I:
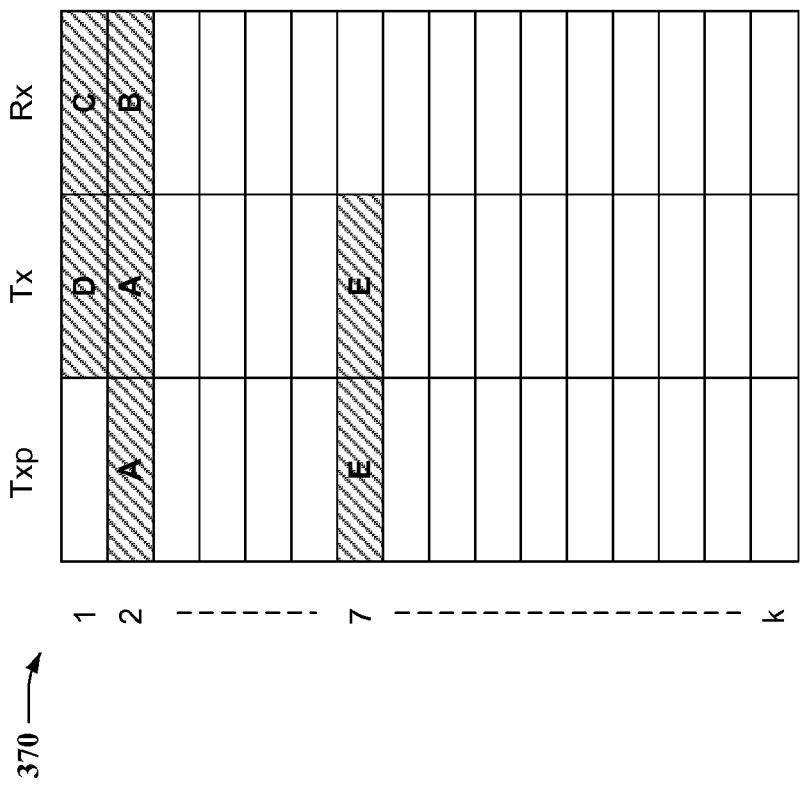
FIG. 3I shows a second diagram for illustrating a connection scheduling signaling scheme for the wireless devices, in accordance with aspects of the disclosure.
Figure 3H:
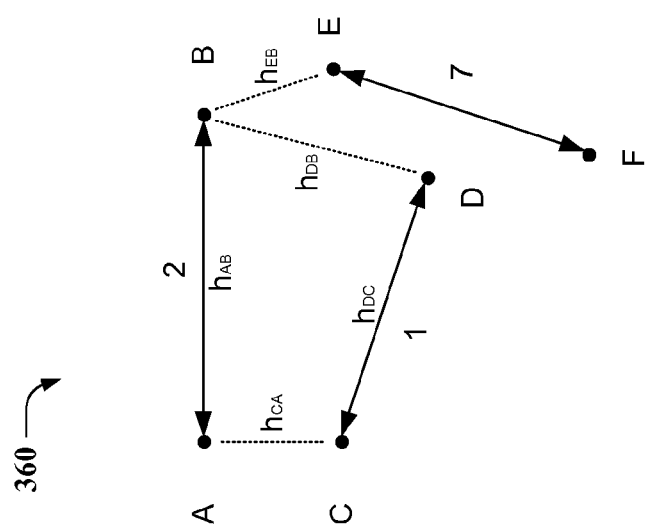
FIG. 3H shows a first diagram for illustrating a connection scheduling signaling scheme for the wireless devices, in accordance with aspects of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of communication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software may be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The software may reside on a computer-readable medium. The computer-readable medium may be a non-transitory computer-readable medium. A non-transitory computer-readable medium include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials.

Accordingly, in one or more aspects of the disclosed approach, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. It should be appreciated that those skilled in the art will recognize how best to implement the described functionality presented throughout this disclosure depending on the particular application and the overall design constraints imposed on the overall system.

The teachings herein may be incorporated into (e.g., implemented within or performed by) a variety of apparatuses (e.g., devices). For example, one or more aspects taught herein may be incorporated into a phone (e.g., a cellular phone), a personal data assistant ("PDA"), an entertainment device (e.g., a music or video device), a headset (e.g., headphones, an earpiece, etc.), a microphone, a medical sensing device (e.g., a biometric sensor, a heart rate monitor, a pedometer, an EKG device, a smart bandage, etc.), a user I/O device (e.g., a watch, a remote control, a light switch, a keyboard, a mouse, etc.), an environment sensing device (e.g., a tire pressure monitor), a monitor that may receive data from the medical or environment sensing device, a computer, a point-of-sale device, an entertainment device, a hearing aid, a set-top box, or any other suitable device.

FIG. 1 is a diagram illustrating an example of a hardware implementation for an apparatus 100 employing a processing system 114. The apparatus 100 may comprise a wireless device for use in a wireless communication system. The processing system 114 may be implemented with a memory 105 and a bus architecture, represented generally by the bus 102. The bus 102 may include any number of interconnecting buses and bridges depending on the specific application of the processing system 114 and the overall design constraints. The bus 102 links together various circuits including one or more processors and/or hardware modules, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatuses over a transmission medium.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

In accordance with aspects of the disclosure, the apparatus 100 may be configured as a packet generator to generate one or more packets including variable length packets. Each of the variable length packets may comprise a packet header having a packet format field with an indicator (e.g., a first indicator) that indicates whether the packet header comprises a payload length field and whether the variable length packet comprises a payload. The transceiver 110 may be configured as a transmitter to transmit each of the variable length packets via an antenna.

In accordance with aspects of the disclosure, the apparatus 100 may be configured as a packet generator to generate an indicator (e.g., a second indicator) based on a content of data, attach the indicator to the data, and assemble the payload.

The apparatus 100 may include additional modules that perform each of the steps in the flow charts described herein. As such, each step in the flow charts may be performed by a module and the apparatus 100 may include one or more of those modules configured to perform various aspects of the disclosure.

Figure 4:
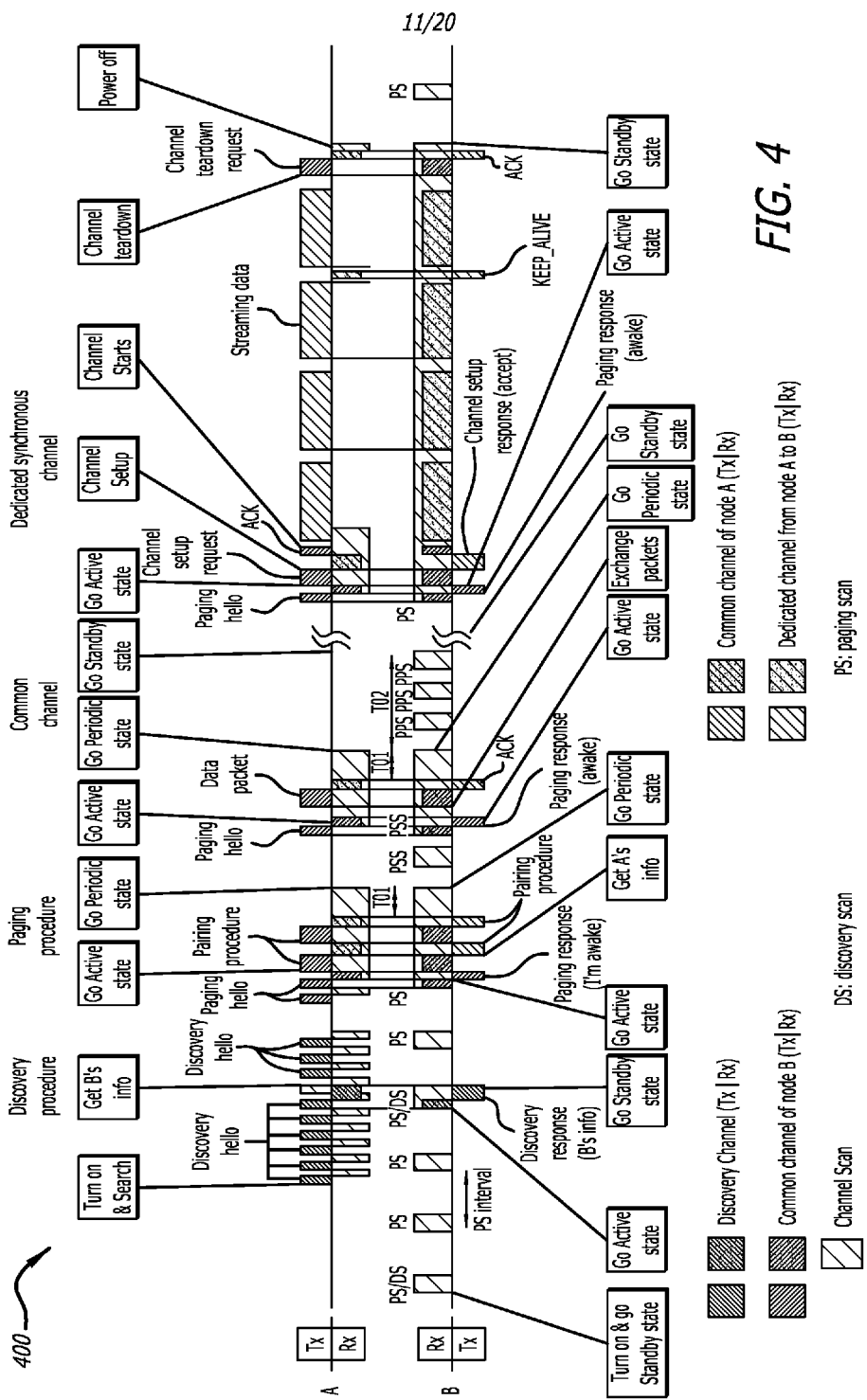
FIG. 4 shows a diagram for illustrating an example of a communication cycle utilized in the disclosed system, in accordance with aspects of the disclosure.

FIG. 4 shows a diagram 400 for illustrating an example of communication cycle for PeANUT MAC, which references PeANUT MAC operations through an example between, for example, two PeANUT devices. The two devices, for example, node A and node B, complete a typical life cycle of communication in FIG. 4, showing an overview of PeANUT MAC operation.

Initially, node B turns on and stays in standby state. It periodically scans its common channel and discovery channel. Later, node A turns on and decides to search for neighboring nodes. Node A invokes a discovery procedure by alternatively sending a discovery packet (e.g., a hello packet, as described herein) and listening for a discovery response on the discovery channel. After a successful discovery procedure, node A knows the DevAddr of node B and starts to page node B on its common channel. Since this is the first time of paging, the two nodes need to exchange extra packets for pairing, establishing security key, and negotiating TxID after paging procedure succeeds.

The paging procedure is invoked every time when node A wakes up node B, brings it to active state, and sends data traffic. Based on different QoS (Quality of Services) requirements, Node B may reply with an Acknowledgement packet upon a successful reception of a data packet. For framed data, node A may send packets to node B immediately after the paging procedure on its common channel. For streaming data, node A initiates a channel setup procedure to set up a dedicated synchronous channel. Another channel teardown procedure may be used to terminate streaming and go to standby state or power off.

FIG. 5A shows a diagram 500 for illustrating an example of packet structure, such as a variable length packet structure, for wireless peer-to-peer communication using, for example, ultra-wide band based technology including Qualcomm Personal Area Network Low power technology (PeANUT) in a mesh based network. The packet structure applies to all but ranging packets, which is described herein. The packet structure comprises one or more components including, for example, a preamble header having a preamble field and a delimiter field, a packet header having a packet format field and an optional payload length field, and a payload having payload header fields, data, a MIC (Message Integrity Code) field, and a CRC (Cyclic Redundancy Check) field. In one aspect of the disclosure, the preamble header includes preambles for acquisition, the packet header is coded in 1/15 repetition code, and the payload is modulated by 1/4 (k=5) convolutional code plus (63, 55) Reed-Solomon (RS) code (6-bit word). The composition of each field is described herein.

In one aspect of the disclosure, referring to the packet header of FIG. 5A, the packet format field determines if the payload (packet) length field is transmitted with the packet. In one example, if the packet format field indicates a default packet length, then the payload length field is not sent, and a default payload (packet) length may be assumed by a receiving system. If a payload (packet) length is pre-negotiated as a default packet length, then there is no need to transmit packet length. In another example, the payload (packet) length field indicates the length of the payload or packet. As such, the payload (packet) format field includes an indicator (e.g., a first indicator) that indicates whether the packet header includes the payload length field and whether the packet structure includes a payload, and if the packet structure includes a payload length field, then the payload length field indicates the length of the packet.

Referring to FIG. 5A, time references are defined with reference to the packet structure. A packet start time is defined as the start time of the first symbol of the preamble. The packet reference time is defined as the end time of the last symbol of the delimiter field. The packet end time is defined as the end time of the last symbol of the packet. These values are measured based on local clock.

In reference to bit ordering, the packet structure is presented with the most significant bit (MSB) on the left, and the least significant bit (LSB) on the right. All packets are transmitted and received leftmost field first, and all fields are transmitted and received MSB first.

In reference to the preamble header, the preamble comprises repetitions of P-seq (e.g., 64-pulse word). Due to preamble configuration, a P10× preamble (i.e., short preamble) comprises 10× of P-seq., which is 10*64=640 PRI (80 PTU); a P20× preamble (i.e., regular preamble) comprises 20× of P-seq., which is 20*64=1280 PRI (160 PTU); and a P40× preamble (i.e., long preamble) comprises 40× of P-seq., which is 40*64=2560 PRI (320 PTU).

One example of using the long preamble or P40× preamble is in paging response. The delimiter field marks the beginning of the packet header, and the delimiter field comprises another PN sequence of pulses, which is derived from the P-seq. The length of delimiter is 64 PRI (8 PTU). The delimiter field always follows the preamble. The preamble header is transmitted using the same time-hopping sequence as the payload, except that the time-hopping sequence is not offset due to channel parameter THOffset.

In reference to the packet header, the packet header comprises a packet format (PF) field and an optional payload length field. The packet header uses the same PRF as the preamble header, and the packet header uses the same time-hopping sequence as the payload. The PF field specifies payload PRF, payload modulation scheme, and packet structure. The length of the PF field is 4 bits, lasting 4*15=60 PRI. The 0-bit PF field is divided into two upper bits and two lower bits. The two upper bits is reserved for expandability and may be set to 00b, and the two lower bits specify three packet formats. The valid values of the PF field include:
    0x0: no payload length field, no payload;
    0x1: no payload length field, but have payload;
    0x3: have payload length field and payload;
    0x2: have ranging header field and payload of ranging sequences; and
    0x4-0xf: reserved.

In an aspect of the disclosure, each apparatus 100 may be configured to generate variable length packets having a packet structure readable by itself and each other apparatus 100. Each of the variable length packets includes a packet header having a packet format field comprising an indicator (e.g., a first indicator) that indicates whether the packet header includes a payload length field and whether the packet includes a payload. The indicator is configured to indicate one of first, second, and third states. The first state comprises no payload length field and no payload (0x0). The second state comprises no payload length field and a payload (0x1). In an example of the second state, the payload may have a default payload length. The third state comprises a payload length field and a payload (0x3). In an example of the third state, the payload may have a length defined by the payload length field.

The payload length field of 11 bits specifies the length of payload in bytes if the packet format is 0x3. Although the 11 bits enable 2047 bytes payload, a maximal payload length is restricted to be 1296 bytes, allowing 1280 bytes of IPv6 packet plus 16 bytes of MAC overhead. The payload length includes all fields in payload, but may not include modulation overhead, such as RS parity bits and convolutional tail bits. The minimum payload length is 5 bytes for a supervisory packet.

In one aspect of the disclosure, an octet aligned string PacketHeaderStr is defined as follows:
    If payload length field is omitted in packet header, then:
    PacketHeaderStr=[0000b||PF].
    If payload length field is inserted in packet header, then:
    PacketHeaderStr=[0b||PF||payload length].

The ranging header field is also 11 bits. If the packet format is 0x2, the ranging header field specifies the ranging algorithm version and ranging sequence number of the ranging packet.

In reference to the payload, the payload header fields include a payload control field (8 bits), and the payload control field comprises packet subfields including:

Packet Type Subfield: Type (2 bits) subfield specifies the packet type:
    00b: reserved;
    01b: data packet;
    10b: supervisory packet; and
    11b: control packet.

Packet Security Key ID Subfield: Security key ID (2 bits) subfield specifies which security key to use:
    00b: null (using a default key, e.g., "QUALCOMM™ KEY");
    01b: key #1;
    10b: key #2; and
    11b: reserved.

Packet Transmitter Address Format Subfield: Transmitter (Tx) address format (2 bits) subfield specifies the length of the transmitter address field (Tx address field):
    00b: Tx address field is omitted;
    01b: Tx address field comprises 8-bit TxID;
    10b: Tx address field comprises 64-bit DevAddr; and
    11b: reserved.

Packet Acknowledgement Request Subfield: Acknowledgement (Ack) request (1 bit) subfield specifies whether or not to acknowledge the data/control packet:
    0b: ack not requested; and
    1b: ack requested.

In one aspect of the disclosure, if one or more of the packets comprise a payload, the payload comprises a payload control field comprising a packet type subfield configured to indicate a packet type, a packet security key ID subfield, a transmitter address format subfield, and a packet acknowledgement request subfield. In an implementation, the packet type subfield may be configured to indicate one of first, second, and third types, wherein the first type is a data packet, the second type is a supervisory packet, and the third type is a control packet. In another implementation, if the packet type is the second type (i.e., supervisory packet), then the data portion of the packet may be configured to indicate one of first, second, and third subtypes, wherein the first subtype is a NULL-DATA packet, the second subtype is an ACK packet, and the third subtype is a KEEP_ALIVE packet. In one aspect of the disclosure, the payload control field is configured to provide a channel management protocol (CMP) message format for wireless peer-to-peer communication using, for example, ultra-wide band based technology including Qualcomm Personal Area Network Low power technology (PeANUT) in a mesh based network. In one example, the payload control field indicates a CMP message of the PeANUT MAC layer, which may be utilized to control channel behaviors and negotiate channel parameters. The CMP comprises a serial of control messages that are carried by control packets. The control messages are generated and consumed by a channel manager. The control packet carries a control message comprising an indicator (e.g., a second indicator) comprising, for example, an 8-bit CMID (control message identifier) and the content of zero or several octets.

In reference to the payload, the payload header fields include a sequence number field (8 bits) that serves at least two purposes. First, an ACK packet copies the sequence number of the acknowledged data/control packet, and second, it is the lower 8 bits of a 40-bit virtual sequence number (VSN) for encryption and authentication processes. The upper 32 bits of VSN is maintained locally.

In reference to the payload, the payload header fields include a Tx address field (0, 8 or 64 bits). Depending on the Tx address format subfield in the payload control field, the Tx address field may be omitted, comprise an 8-bit TxID, or comprise a 64-bit DevAddr of the transmitter node.

In reference to the payload, as shown in FIG. 5A, the payload comprises a data portion with the second indicator (i.e., CMID) as a first field in the data portion. The second indicator comprises an 8-bit CMID (control message identifier) and/or the content of zero or several octets. In some examples, control messages may refer to a discovery request, discovery response, paging response, transmission identification request, transmission identification response, among many other types of control messages. These and other aspects related to the payload data portion and channel management protocol (CMP) message format is described in greater detail herein.

In an aspect of the disclosure, the apparatus 100 may be configured as a packet generator to generate an indicator (e.g., a second indicator) based on a content of data, attach the indicator to the data, and assemble the payload. The indicator may comprise an 8-bit control message identifier (CMID). The indicator (i.e., CMID) identifies a type of data in the payload. The content of the data may be dependent on the indicator (i.e., CMID). The indicator (i.e., CMID) and the data are part of a payload portion of a packet. The indicator (i.e., CMID) is attached to the data as a first field in a data portion of the packet. The packet generator may be further configured to generate packets comprising the payload having the data and the indicator (i.e., CMID). The packet generator may be further configured to generate packets comprising the payload having a data portion, and the indicator (i.e., CMID) is a first field in the data portion of the payload.

In reference to the payload, the payload includes a MIC field and a CRC field. MIC refers to message integrity code that is inserted in data and control packets and may be omitted in supervisory packets. When MIC is inserted, it protects packet header fields, payload header fields, and data by defining a header string A and data string P, wherein:

A=[PacketHeaderStr||payload control||sequence number||TxDevAddr]; and
P=[data].

In reference to the payload, the CRC field protects a packet, including packet header fields, payload header fields, data, and MIC, against communication errors. The CRC calculation is based on the following bit string C.

C=[PacketHeaderStr||payload control||sequence number||TxDevAddr||P'||MIC], wherein:
P'=[Encrypted Data], which is encrypted version of data string P.

The 16-bit CRC is calculated using the CRC-CCITT generator polynomial:

$$G_{16}(x)=x^{16}+x^{12}+x^5+1.$$

A typical implementation is a 16-bit LFSR. The initial states of the registers may be set to zero. Note that though the Tx address field in the payload header have three formats, the MIC and CRC are calculated using the 64-bit DevAddr of the transmitter node. If the TxID mismatch happens, the MIC and CRC check will fail. Although the misdetection rate of the CRC is $2^{-16}$, the probability of passing an erroneous packet to the higher layer is actually $2^{-48}$, a combined effect of CRC and MIC.

Referring to FIG. 5A, the payload is modulated using ¼ (k=5) convolutional code+(63, 55) RS code (6-bit word)+interleaver (512-pulse block). The actual payload duration and the number of over-the-air pulses may be computed from the payload length.

Figure 5B:
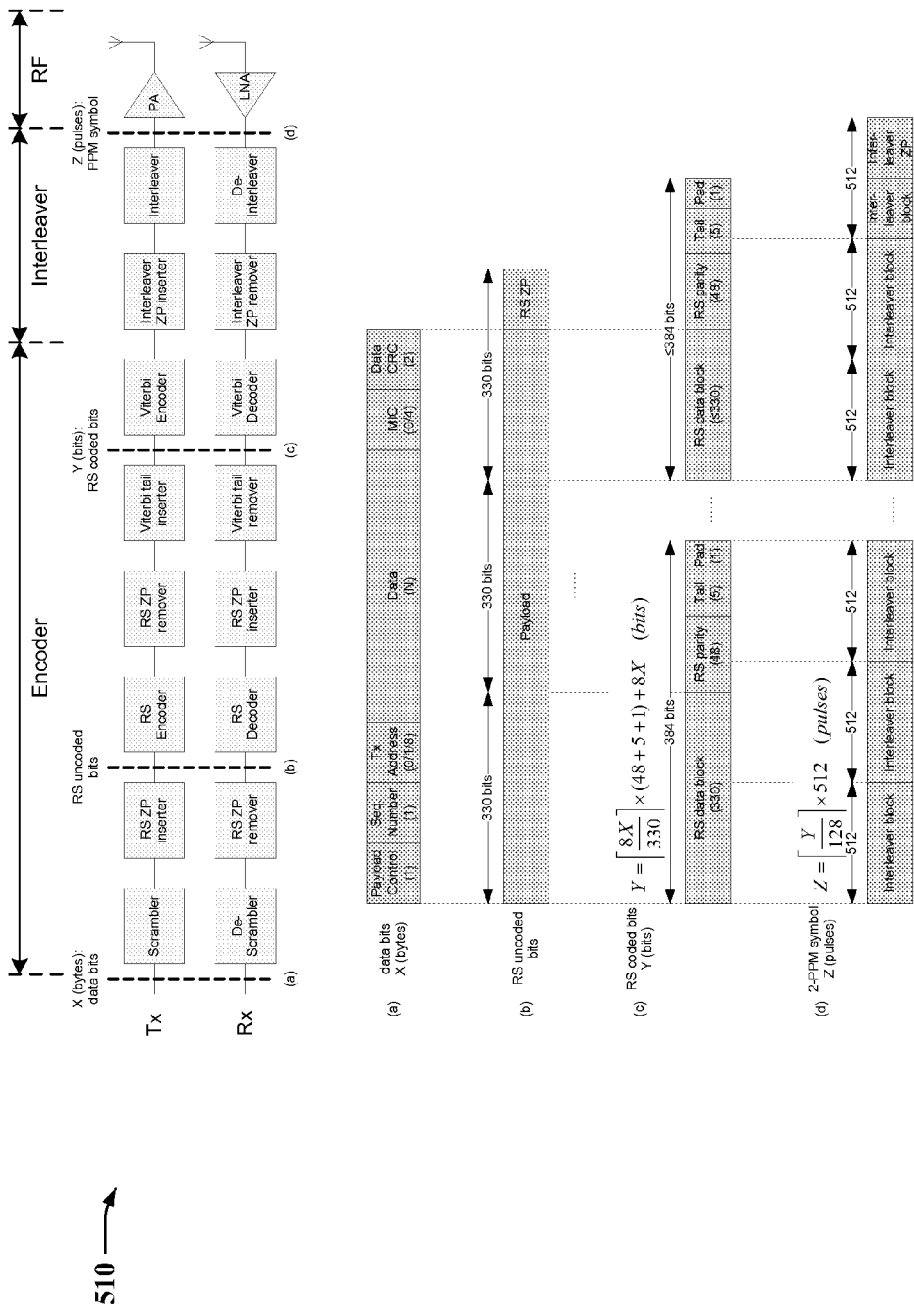
FIG. 5B shows a diagram for illustrating a payload modulation that may be utilized in the disclosed system, in accordance with aspects of the disclosure.

FIG. 5B shows a diagram 510 for illustrating an example of payload modulation of how data bits are modulated before transmitting. As shown, the payload length of data bits at (a) is denoted by X bytes; the RS coded bits at (c) is denoted by Y bits; and in the end, the B-PPM symbols at (d) is denoted by Z pulses.

The data bits of the payload are divided into RS coding blocks. Each RS coding block comprises (55 symbols)*(6 bits/symbol)=330 bits. If the residue payload length is less than 330 bits, the last RS coding block is padded with zeros so as to compute the RS parity. The RS padding is inserted at (b), before the RS encoder. However, the padding is for RS parity computation only and is removed after the RS encoder. At (c), the overhead of 48 bits RS parity, 5 bits convolutional tail and 1 bit padding is inserted. The only purpose of the 1 bit padding is to make an RS coding block to align with the interleaver block. This overhead applies to every RS coding block, including the last RS block of less than 330 bits.

FIGS. 5C-5G show various diagrams for illustrating example of packet types, such as various types of variable length packets including their related packet structure, in accordance with aspects of the disclosure.

FIG. 5C shows a diagram 520 for illustrating an example of packet type, such as a hello packet. The hello packet is configured to be a "dumb" packet with no payload, as shown in FIG. 5C. The packet format field is set to 0x0; there is no payload length field, nor payload; and the duration of a hello packet is, for example, fixed 175.5 PTU. Hello packets are used in discovery procedure and paging procedure. During a discovery procedure, the PLTX node repeatedly sends hello packets, and upon receiving a hello packet, the PLRX node responds with a CMP_discovery_response message to identify itself. During a paging procedure, the PLTX node repeatedly sends hello packets. Upon receiving a hello packet, the PLRX node responds with a CMP_paging_response message to announce "I'm awake". Hello packets are the same in above procedures. If hello packets are sent on a discovery channel, then each hello packet is considered a discovery request; otherwise each hello packet is considered a paging request.

FIG. 5D shows diagrams 530, 532 for illustrating another example of packet type, such as a data packet. Data packets carry user data on all channel types except the discovery channel. A data packet may use any preamble types; the packet format field may be set to 0x1 (e.g., as shown in diagram 530 without a payload length field) or 0x3 (e.g., as shown in diagram 532 with a payload length field); and the type subfield in the payload control field may be set to 0x1. The data packet structure is shown in FIG. 5D, for example, in two packet formats 530, 532.

The preamble of data packets may be P20x on common and dedicated asynchronous channels. On dedicated synchronous channels, the preamble may be a short (P10x), regular (P20x) or long (P40x) preamble, depending on InterArrivalTime. The minimum length of user data may be 1 byte; the maximum length of user data may be (MaxPayloadLength—16) bytes, which is no longer than 1280 bytes. The diagram 530 of FIG. 5D shows a minimal length of a data packet without a payload length field. Assume that the preamble uses P10x, and the data length N is small to fit into one RS block and one interleaver block. Thus, the data length N has to be 1 byte; the payload length is (1+8)=9 bytes; the overhead of preamble header and packet header is (64*11+15*4)=764 PRI=95.5 PTU; and the total duration of the data packet is (95.5+64) =159.5 PTU.

The diagram 532 of FIG. 5D shows a maximal length of a data packet with a payload length field. In this instance, the preamble uses P20x and the data length is N=1280 bytes such that the payload length is the maximum 1296 bytes. The overhead of preamble header and packet header is (64*21+ 15*15)=1569 PRI=196.1 PTU; and the total duration of the data packet is (196.1+64*95)=6276.1 PTU, divided into 32 RS blocks and 95 interleaver blocks. Another typical data packet size is the one that fits 5 ms InterArrivalTime. Assume that the payload length field is omitted. In this instance, the preamble may use P10x; the data size is N=636 bytes such that the payload length is 644 bytes; there are 16 RS blocks and 47 interleaver blocks; and the total duration of the data packet is (95.5+64*47)=3103.5 PTU.

FIG. 5E shows diagrams 540, 542 for illustrating another example of packet type, such as a supervisory packet. A supervisory packet carries a one-byte supervisory message in the data field. The packet format field of a supervisory packet may be set to 0x3; the payload length field may be inserted; and the payload comprises one RS block. In the payload control field of supervisory packet, the type subfield may be set to 0x2; the security key ID subfield may be set to 0x0 (null); and the ack request subfield may be set to 0. The supervisory packet structure is shown FIG. 5E, for example, in two packet formats 540, 542.

The supervisory message has values—ACK, KEEP_ALIVE and NULL_DATA.

The supervisory message may not be encrypted.

NULL_DATA (0x00), a sniff packet for state synchronization while a data packet is not available in the transmitting buffer;

ACK (0x01), indicating that the CRC of the acknowledged packet has passed;

KEEP_ALIVE (0x02), indicating the presence of the PLRX node; and

0x03-0xff: reserved.

The supervisory packet is referred to as an ACK packet if the supervisory message is an ACK message. The ACK packet is sent after receiving a data/control packet having the ack request subfield in the payload control field is set to 1. The ACK packet may satisfy the supervisory packet timing.

The ACK packet may start with a P10x preamble. The sequence number field may copy the sequence number of the received packet. The ACK packet structure is shown in the diagram 540 of FIG. 5E.

The supervisory packet is referred to as a KEEP_ALIVE packet if the supervisory message is a keep-alive message. KEEP_ALIVE packets are used on one-way synchronous channels to keep the channel alive between PLTX and PLRX nodes. A KEEP_ALIVE packet is sent from PLRX node to PLTX node when the received packet satisfies condition:

[(virtual sequence number) mod (KeepAlivePeriod)=KeepAliveOffset].

The KEEP_ALIVE packet may satisfy the supervisory packet timing.

The KEEP_ALIVE packet may start with a P10x preamble. The sequence number field may be set to 0x0. The Tx address format subfield in the payload control field may be set to 0x1 or 0x2. The Tx address field may be set accordingly. The KEEP_ALIVE packet structure is shown in the diagram 540 of FIG. 5E.

The supervisory packet is referred to as a NULL_DATA packet if the supervisory message is a null-data message. NULL_DATA packets are sent from PLTX node to PLRX node when the transmitting buffer is underflow.

The NULL_DATA packet may apply the preamble type based on parameter PLPreambleType or SLPreambleType and may apply sequence number as if it is a normal data packet. The Tx address format subfield in the payload control field is set to 00b. The sequence number field is set as if it is a normal data packet. The Tx address field may be omitted. The NULL_DATA packet structure is shown in the diagram 542 of FIG. 5E.

There are different payload lengths of supervisory packet, depending on the Tx address format subfield in the payload control field, as follows.

If the Tx address format subfield is set to 00b, the payload length field is set to 5; the Tx address field is omitted; and the payload comprises 1 interleaver block.

If the Tx address format subfield is set to 01b, the payload length field is set to 6; the Tx address field comprises an 8-bit TxID; and the payload comprises 1 interleaver block.

If the Tx address format subfield is set to 10b, the payload length field is set to 13; the Tx address field comprises a 64-bit DevAddr; and the payload comprises 2 interleaver blocks.

FIG. 5F shows a diagram 550 for illustrating another example of packet type, such as a ranging packet. Ranging packets carry ranging sequences that facilitate time synchronization and data collection during a ranging procedure. A ranging packet starts with a short (P10x) or regular (P20x) preamble. The packet format field may be 0x2. The packet format field is followed by a ranging header field of 11 bits, comprising 3-bit ranging algorithm version, 3-bit sequence number and 5 reserved bits. The ranging packet structure is shown in FIG. 5F.

The payload of a ranging packet comprises a ranging sequence. The length of ranging sequence may be specified in PeANUT PHY Spec, along with specification of the ranging algorithms. As shown in FIG. 5F, there is no payload header or MIC/CRC in the payload of a ranging packet.

FIG. 5G shows diagrams 560, 562 for illustrating another example of packet type, such as a control packet. Control packets carry control messages in the data field. Each control packet usually starts with a regular (P20x) preamble. There may be one exception, wherein a control packet carrying a CMP_paging response message may start with a long (P40x) preamble. The packet format field may be set to 0x1 (e.g., as shown in diagram 560 without a payload length field) or 0x3 (e.g., as shown in diagram 562 with a payload length field). The type subfield in the payload control field may be set to 0x3. The control packet structure is shown FIG. 5G, for example, in at least two packet formats 560, 562.

The control message (i.e., data) carried by a control packet is passed to a channel manager (e.g., a processing system) for processing. The control message comprises an 8-bit CMID (control message identifier) field, as a first field in a data portion of a packet, and/or the content of zero or more octets. A control packet can request acknowledgement. At the time that the ACK packet is sent, the channel manager may or may not finish processing the control message. Control packets use the same sequence number space as data packets as long as they are on the same MAC channel. Control packets have higher priority than data packets, thus when a control packet and a data packet are ready to send at the same time, MAC sends the control packet first. However, the retransmission of a data packet is not preempted by a control packet.

In one aspect of the disclosure, channel management protocol (CMP) is utilized to control channel behaviors and negotiate channel parameters. The protocol comprises a series of control messages that are carried by control packets. The control messages are generated and consumed by the channel manager. FIG. 5G shows examples of control packet structures 560, 562. As described herein, a control packet carries a control message (i.e., data) comprising an 8-bit CMID (control message identifier) and/or the content of zero or several octets. In one example, a hello packet is a control message, and hello packets behave as a discovery request on a discovery channel or as a paging request on other channel types.

Control messages include discovery and paging messages. The CMID for discovery and paging messages is between 0x00–0x05. Exchanges of discovery and paging messages may result in establishing an NAL entry with respect to a remote node and passing NAL entry parameters, such as device information and common channel timing parameters.

An example of a discovery control message is a CMP_discovery_request message that allows a node to request information from a remote node. This CMP_discovery_request message may be formatted as in Table 1, as follows:

TABLE 1

CMP_discovery_request message format.

| Bytes: 5 | Field |
|---|---|
| 1 | CMID |
| 3 | DeviceType |
| 1 | DiscReqType. Values are:<br>0x00: seeking all discoverable devices<br>0x01: seeking pairable devices<br>0x02-0xff: reserved |

The CMP_discovery_request message may be sent on a primary link of discovery channel. Channel parameters may be found in the DTX entry. The payload length may be 21 bytes, which may equal channel parameter PLDefaultPayloadLength of the discovery channel. The packet format field of the control packet may be set to 0x1. The payload length field may be omitted.

The type subfield in the payload control field may be set to 0x3. The security key ID subfield in the payload control field may be set to 0x0. The Tx address format subfield in the payload control field may be set to 0x2. The ack request subfield in the payload control field may be set to 0. The Tx address field may include the DevAddr of the local node.

The CMP_discovery_request message may be generated as the channel manager receives the Discovery command. DeviceType field may copy the same-named channel parameter of the DTX entry. DiscReqType field may be set to 0x00, if the message is generated due to a Discovery command from a higher layer and discovery type in the Discovery command is 'discovery only'. DiscReqType field may be set to 0x01, if the message is generated due to a Discovery command from the higher layer and discovery type in the Discovery command is 'discovery and pairing'.

Figure 6:
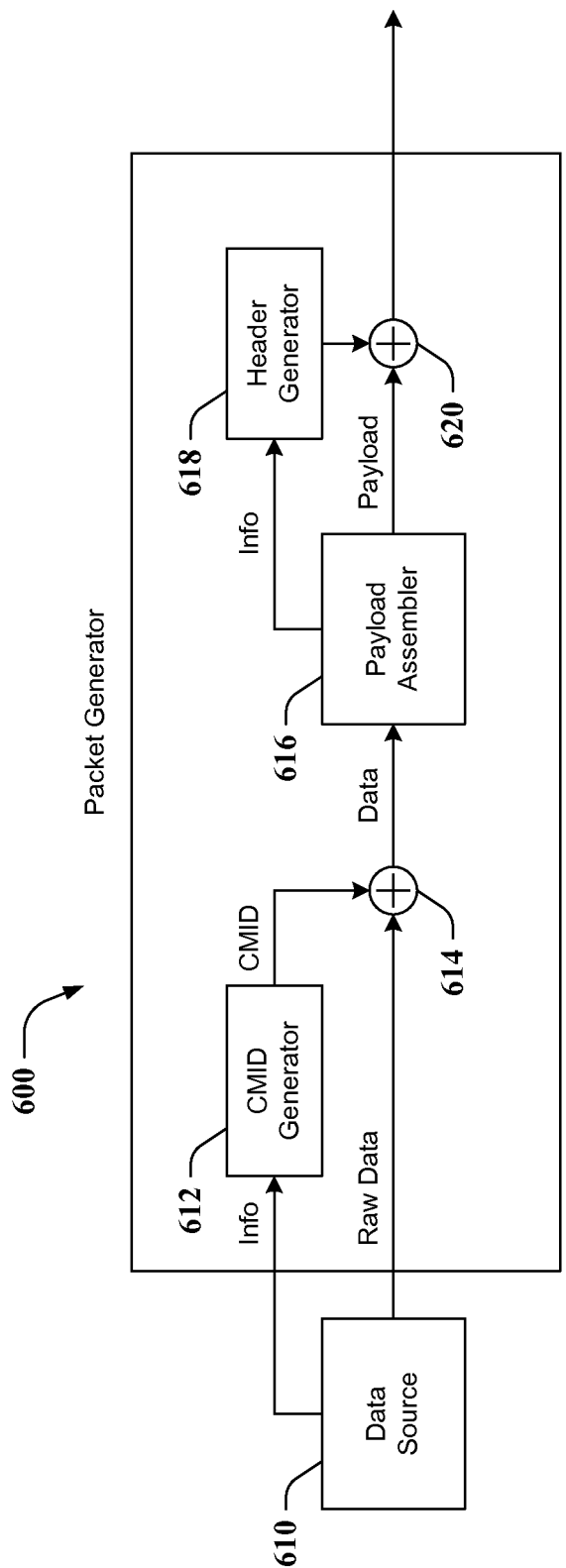
FIG. 6 is a diagram illustrating an example of an implementation for an apparatus comprising a packet generator that may be utilized in the disclosed system, in accordance with aspects of the disclosure.

FIG. 6 is a diagram illustrating an example of an implementation for an apparatus 600 comprising a packet generator configured to generate one or more packets, wherein each of the packets comprises a packet header comprising a packet format field comprising a first indicator that indicates whether the packet header comprises a payload length field and whether the packet comprises a payload. In an example, the packet generator is configured to generate one or more packets as described in reference to the packet structure of FIG. 5A, such as a fixed length and/or variable length packet structure, for wireless communication. As described herein, the payload (packet) length field indicates the length of the payload or packet, and the payload (packet) format field includes a first indicator that indicates whether the packet header includes the payload length field and whether the packet structure includes a payload, and if the packet structure includes a payload length field, then the payload length field indicates the length of the packet.

In another implementation, the packet generator is configured to generate a second indicator (i.e., CMID) based on a content of data, attach the second indicator (i.e., CMID) to the data, and assemble the payload. As described herein, the payload control field is configured to provide a CMP message format for wireless communication in a mesh based network. The control packet carries a control message comprising the second indicator comprising, for example, an 8-bit CMID (control message identifier). In reference to the payload, as shown in FIG. 5A, the payload comprises a data portion with the second indicator (i.e., CMID) as a first field in the data portion of the payload.

In an aspect of the disclosure, referring to FIG. 6, the apparatus 600 (i.e., packet generator) comprises a data source 610, a CMID generator 612, an adder 614, a payload assembler 616, a header generator 618, and another adder 620. The data source 610 is configured to provide raw data to the adder 614 and information related to the raw data to the CMID generator 612. The CMID generator 612 is configured to generate the second indicator (i.e., CMID) based on information from the data source 610 related to the raw data. The CMID generator 612 is configured to provide the second indicator (i.e., CMID) to the adder 614. The adder 614 is configured to receive the raw data from the data source 610 and the second indicator (i.e., CMID) from the CMID generator 612 for attaching the raw data to the second indicator (i.e., CMID) and provide data comprising the second indicator (i.e., CMID) and the raw data to the payload assembler 616. The payload assembler 616 is configured to assemble a payload having a data portion with the second indicator (i.e., CMID) and the raw data, in accordance with aspects of the disclosure. In some implementations, the data source 610 may comprise various devices, including user interfaces, user inputs, user applications, memory, and other input devices.

In an aspect of the disclosure, the payload assembler 616 is configured to provide the payload to the adder 620 and information related to the payload to the header generator 618. The header generator 618 is configured to generate the packet header with the first indicator based on information from the payload assembler 616 related to the payload. The header generator 618 is configured to provide the packet header with the first indicator to the adder 620. The adder 620 is configured to receive the payload from the payload assembler 616 and the packet header having the first indicator from the header generator 618 for attaching the payload to the packet header having the first indicator and provide the payload comprising the packet header and the first indicator as an output from the packet generator 600. The adder 620 is configured to assemble the payload with the packet header having the first indicator, and the payload includes the data portion with the second indicator (i.e., CMID) and the raw data, in accordance with aspects of the disclosure. It should be appreciated that the header may be referred to as a payload header or a packet header, without departing from the scope of the disclosure.

In an aspect of the disclosure, as described herein, the packet generator is configured to generate the first indicator to indicate one of first, second, and third states. The first state comprises no payload length field and no payload. The second state comprises no payload length field and a payload comprising a default payload length. The third state comprises a payload length field and a payload comprising a length defined by the payload length field. The packet generator is configured to generate variable length payloads and thus variable length packets. In an example, each of the packets generated by the packet generator without the first indicator may comprise a default length.

Figure 7A:
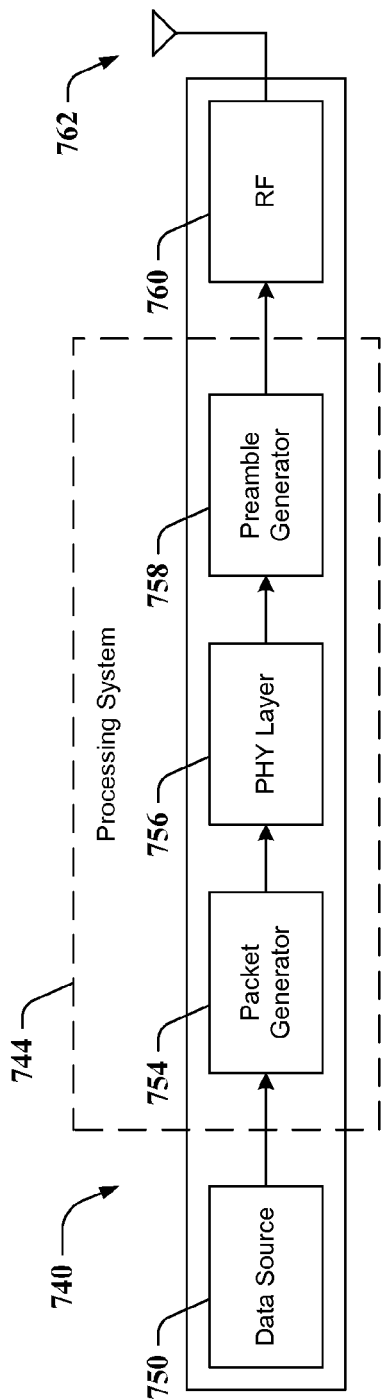
FIG. 7A is a diagram illustrating an example of an implementation for an apparatus comprising a data transmitter that may be utilized in the disclosed system, in accordance with aspects of the disclosure.

FIG. 7A is a diagram illustrating an example of an implementation for an apparatus 740 comprising a processing system 744 and a transmitter 760 configured to transmit a packet having a preamble header, a packet header with a first indicator, and a payload having a data portion with a second indicator as a first field. In an implementation, the processing system 744 comprises a packet generator 754, a physical layer 756, and a preamble generator 758.

In an example, data from a data source 750 is provided to the packet generator 754 for generation and assembly of the first and second indicators, in a manner as described in reference to FIG. 6. The packet generator 754 is configured to assemble the packet having the preamble header, the packet header with the first indicator, and the payload having the data portion with the second indicator (i.e., CMID) as the first field and the raw data, in accordance with aspects of the disclosure. The packet generator 754 is configured to provide the assembled packet to the preamble generator 758 via the physical layer 756 for generating a preamble header to attach to the assembled packet, in a manner as shown in FIG. 5A. The preamble generator 758 is configured to provide the assembled packet having the preamble header to an RF communication component, such as the transmitter 760, for transmission over a wireless communication network via an antenna 762, in accordance with aspects of the disclosure.

Figure 7B:
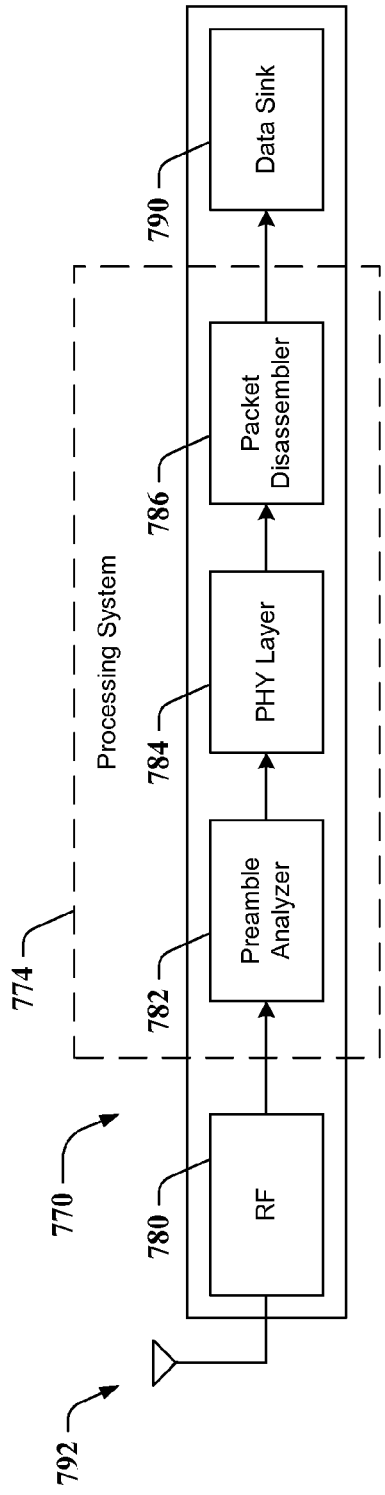
FIG. 7B is a diagram illustrating an example of an implementation for an apparatus comprising a data receiver that may be utilized in the disclosed system.

FIG. 7B is a diagram illustrating an example of an implementation for an apparatus 770 comprising a processing system 774 and a receiver 780 configured to receive a packet having a preamble header, a packet header with a first indicator, and a payload having a data portion with a second indicator as a first field. In an implementation, the processing system 774 comprises a preamble analyzer 782, a physical layer 754, and a packet disassembler 786.

In an example, an RF communication component, such as the receiver 780, is configured to receive assembled packets from a wireless communication network via an antenna 792, in accordance with aspects of the disclosure. The receiver 780 is configured to provide the received assembled packets to the preamble analyzer 782 for delivery to the packet disassembler 786 via the physical layer 784. The packet disassembler 786 is configured to disassemble the packet having the preamble header, the packet header with the first indicator, and the payload having the data portion with the second indicator (i.e., CMID) as the first field and the raw data, in accordance with aspects of the disclosure. The packet disassembler 786 is configured to provide the first and second indicators and the raw data to a data sink 790, in accordance with aspects of the disclosure.

FIG. 8 is a diagram of a flow chart 800 of an example of a method for wireless communication, in accordance with aspects of the disclosure. In an implementation, the method is performed by a wireless device, for example, in communication with another wireless device. As shown in FIG. 8, the wireless device may be configured to identify one or more packets for transmission (802). The wireless device is configured to generate packets (804) including, for example, variable length packets having a packet structure readable by each other wireless device. Each of the packets may include a packet header having a packet format field having an indicator (e.g., the first indicator) that indicates whether the packet header includes a payload length field and whether the packet includes a payload. The wireless device may be configured to encode the payload. In various examples, the first indicator may be configured to indicate one of first, second, and third states. The first state includes no payload length field and no payload. The second state includes no payload length field and a payload having, for example, a default payload length. The third state includes a payload length field and a payload having, for example, a length defined by the payload length field. The wireless device may be configured to store the packets (806), for example, in memory and/or a computer readable medium. The wireless device may be configured to transmit the packets (808), for example, in a wireless communication environment.

FIG. 9 is a diagram 900 illustrating functionality of an example of a wireless device, such as, for example, the apparatus 100 of FIG. 1. The wireless device may include a module (902) configured for identifying one or more packets for transmission. The wireless device includes a module (904) configured for generating packets including variable length packets having a packet structure readable by each other wireless device. Each of the packets may include a packet header having a packet format field having an indicator (e.g., the first indicator) that indicates whether the packet header includes a payload length field and whether the packet includes a payload. The wireless device may be configured to encode the payload with a means for encoding, such as the processing system 114 of FIG. 1, which may comprise the functionality of an encoder. In various examples, the first indicator may be configured to indicate one of first, second, and third states. The first state includes no payload length field and no payload. The second state includes no payload length field and a payload having, for example, a default payload length. The third state includes a payload length field and a payload having, for example, a length defined by the payload length field. The wireless device may include a module (906) configured for storing the packets, for example, in memory and/or a computer readable medium. The wireless device may include a module (908) configured for transmitting the packets, for example, in a wireless communication environment.

The wireless device may include additional modules that perform each of the steps in the aforementioned flow charts. As such, each step in the aforementioned flow charts may be performed by a module and the wireless device may include one or more of those modules configured to perform various aspects of the disclosure.

FIG. 10 is a diagram of a flow chart 1000 of an example of a method for wireless communication, in accordance with aspects of the disclosure. In an implementation, the method is performed by a wireless device, for example, in communication with another wireless device. As shown in FIG. 10, the wireless device is configured to generate an indicator (e.g., the second indicator, such as a CMID) based on a content of data (1002), attach the indicator to the data (1004), and assemble a payload (1006) in accordance with aspects of the disclosure. In an implementation, the second indicator (i.e., CMID) identifies a type of data in the payload. The content of the data may be dependent on the second indicator. The second indicator may comprise an 8-bit control message identifier (CMID). The second indicator and the data are part of the payload of a packet. The second indicator is attached to the data as a first field in a data portion of the payload.

FIG. 11 is a block diagram 1100 illustrating functionality of an example of a wireless device, such as, for example, the apparatus 100 of FIG. 1. The wireless device includes a module (1102) configured for generating an indicator (e.g., the second indicator, such as a CMID) based on a content of data, a module (1104) configured for attaching the indicator to the data, and a module (1106) configured for assembling a payload in accordance with aspects of the disclosure. In an implementation, the second indicator (i.e., CMID) identifies a type of data in the payload. The content of the data may be dependent on the second indicator. The second indicator may comprise an 8-bit control message identifier (CMID). The second indicator and the data are part of the payload of a packet. The second indicator is attached to the data as a first field in a data portion of the payload.

The wireless device may include additional modules that perform each of the steps in the aforementioned flow charts. As such, each step in the aforementioned flow charts may be performed by a module, and the wireless device may include one or more of those modules configured to perform various aspects of the disclosure.

Figure 12:
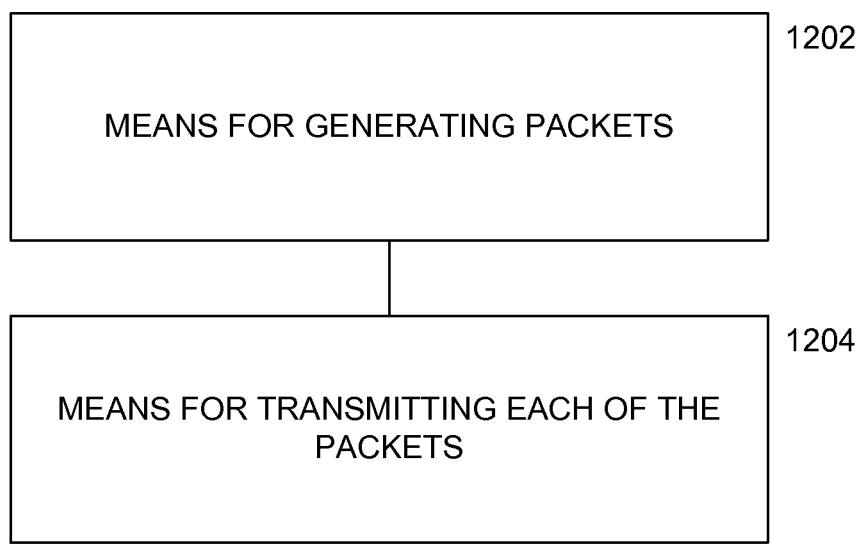
FIG. 12 is a diagram of an apparatus for wireless communication in accordance with aspects of the disclosure.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. Referring to FIG. 12 as an example, in one configuration, an apparatus 1200 for wireless communication includes a means 1202 for generating packets including, for example, variable length packets having a packet structure readable by each other apparatus 100, wherein each of the variable length packets includes a packet header having a packet format field comprising an indicator (e.g., the first indicator) that indicates whether the packet header includes a payload length field and whether the packet includes a payload. The first indicator may be configured to indicate one of first, second, and third states. The first state includes no payload length field and no payload. The second state includes no payload length field and a payload having, for example, a default payload length. The third state includes a payload length field and a payload having, for example, a length defined by the payload length field. The apparatus 1200 also includes a means 1204 for transmitting the packet. In one configuration, the means 1204 for transmitting the packet comprises the transceiver 110 in FIG. 1. In another configuration, the means 1204 for transmitting the packet comprises the transmitter 760 in FIG. 7.

Continuing to refer to FIG. 12, in one configuration, the means 1202 for generating packets in the apparatus 1200 comprises the processing system 114 to generate an indicator (e.g., the second indicator, such as a CMID) based on a content of data, as a means for attaching the indicator to the data, and to assemble a payload in accordance with aspects of the disclosure. In an implementation, the second indicator (i.e., CMID) identifies a type of data in the payload. The content of the data may be dependent on the second indicator. The second indicator may comprise an 8-bit control message identifier (CMID). The second indicator and the data are part of the payload of a packet. The second indicator is attached to the data as a first field in a data portion of the payload.

In one configuration, the means 1202 for generating packets may comprise the packet generator 700 of FIG. 6 to generate packets including, for example, variable length packets having a packet structure readable by each other apparatus 100, wherein each of the variable length packets includes a packet header having a packet format field comprising an indicator (e.g., the first indicator) that indicates whether the packet header includes a payload length field and whether the packet includes a payload.

Further, in one configuration, the means 1202 for generating packets may also generate a payload comprising the payload header with the first indicator. The means 1202 for generating packets may also comprise means for assembling the payload that assembles the payload having a data portion, wherein the second indicator is a first field in the data portion of the payload. The means 1202 for generating packets may also generate the payload with a preamble header having one or more repetitions of a pulse sequence, a delimiter that indicates a start of a packet header having a sequence related to the pulse sequence, and the payload having a data portion with the second indicator as a first field.

In yet another configuration, the means 1202 for generating packets comprises means for generating an indicator (e.g., the second indicator, such as a CMID) based on a content of data. The means for generating an indicator may comprise, for example, the CMID generator 712. The means 1202 for generating packets may also comprise a means for attaching the second indicator to the data comprising, for example, the adder 714.

As used herein, a phrase referring to "at least one" of a list of items refers to any combination of those items, including single members. As an example, "at least one of: a, b, or c" is intended to cover: a, b, c, a-b, a-c, b-c, and a-b-c.

It is understood that the specific order or hierarchy of steps in the processes disclosed is an illustration of example of approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope comprised with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. An apparatus for wireless communication, comprising:
   a packet generator configured to generate packets, wherein each of the packets comprises a packet header comprising a packet format field comprising a first indicator that indicates one of first, second, and third states,
      wherein the first state indicates the packet having no payload length field and no payload present,
      wherein the second state indicates the packet having no payload length field and a payload comprising a default payload length, and
      wherein the third state indicates the packet having a payload length field and a payload comprising a length defined by the payload length field; and
   a transmitter configured to transmit each of the packets.

2. The apparatus of claim 1, wherein the packets comprise variable length packets.

3. The apparatus of claim 1, wherein each of the packets generated by the packet generator with the first indicator indicating no payload length field in the packet header comprises a default length.

4. The apparatus of claim 1, wherein each of the packets generated by the packet generator comprises a preamble header comprising one or more repetitions of a pulse sequence.

5. The apparatus of claim 4, wherein the preamble header comprises a delimiter that indicates a start of the packet header that further comprises a sequence related to the pulse sequence.

6. The apparatus of claim 1, wherein the packet header is coded in $1/15$ repetition code.

7. The apparatus of claim 1, wherein when one or more of the packets comprise a payload, the payload comprises a payload control field comprising:
a packet type subfield configured to indicate a packet type;
a packet security key identification (ID) subfield;
a transmitter address format subfield; and
a packet acknowledgement request subfield.

8. The apparatus of claim 7, wherein the packet type subfield indicates one of first, second, and third types,
wherein the first type is a data packet,
wherein the second type is a supervisory packet, and
wherein the third type is a control packet.

9. The apparatus of claim 8, wherein when the packet type is the second type, then a data portion indicates one of first, second, and third subtypes,
wherein the first subtype is a NULL-DATA packet,
wherein the second subtype is an ACK packet, and
wherein the third subtype is a KEEP_ALIVE packet.

10. The apparatus of claim 1, wherein when one or more of the packets comprise a payload, the payload comprises a sequence number field and a transmitter address field.

11. The apparatus of claim 1, wherein when one or more of the packets comprise a payload, the payload comprises at least one of a MIC (Message Integrity Code) field or a CRC (Cyclic Redundancy Check) field, and the payload is modulated by $1/4$ convolutional code plus (63,55) Reed-Solomon (RS) code.

12. The apparatus of claim 1, wherein the packet generator is further configured to generate a second indicator based on a type of data in the payload, and attach the second indicator to the data.

13. The apparatus of claim 12, wherein the second indicator comprises an 8-bit control message identifier (CMID).

14. The apparatus of claim 12, wherein the second indicator is attached to the data as a first field in a data portion of the payload.

15. A method for wireless communication, comprising:
generating packets, wherein each of the packets comprises a packet header comprising a packet format field comprising a first indicator that indicates one of first, second, and third states,
wherein the first state indicates the packet having no payload length field and no payload present,
wherein the second state indicates the packet having no payload length field and a payload comprising a default payload length, and
wherein the third state indicates the packet having a payload length field and a payload comprising a length defined by the payload length field; and
transmitting each of the packets.

16. The method of claim 15, wherein the packets comprise variable length packets.

17. The method of claim 15, wherein each of the packets generated with the first indicator indicating no payload length field in the packet header comprises a default length.

18. The method of claim 15, wherein each of the packets comprises a preamble header comprising one or more repetitions of a pulse sequence.

19. The method of claim 18, wherein the preamble header comprises a delimiter that indicates a start of the packet header that further comprises a sequence related to the pulse sequence.

20. The method of claim 15, wherein the packet header is coded in $1/15$ repetition code.

21. The method of claim 15, wherein when one or more of the packets comprise a payload, the payload comprises a payload control field comprising:
a packet type subfield configured to indicate a packet type;
a packet security key identification (ID) subfield;
a transmitter address format subfield; and
a packet acknowledgement request subfield.

22. The method of claim 21, wherein the packet type subfield indicates one of first, second, and third types,
wherein the first type is a data packet,
wherein the second type is a supervisory packet, and
wherein the third type is a control packet.

23. The method of claim 22, wherein when the packet type is the second type, then a data portion indicates one of first, second, and third subtypes,
wherein the first subtype is a NULL-DATA packet,
wherein the second subtype is an ACK packet, and
wherein the third subtype is a KEEP_ALIVE packet.

24. The method of claim 15, wherein when one or more of the packets comprise a payload, the payload comprises a sequence number field and a transmitter address field.

25. The method of claim 15, wherein when one or more of the packets comprise a payload, the payload comprises at least one of a MIC (Message Integrity Code) field and a CRC (Cyclic Redundancy Check) field, and the payload is modulated by $1/4$ convolutional code plus (63,55) Reed-Solomon (RS) code.

26. The method of claim 15, further comprising:
generating a second indicator based on a type of data in the payload; and
attaching the second indicator to the data.

27. The method of claim 26, wherein the second indicator comprises an 8-bit control message identifier (CMID).

28. The method of claim 26, wherein the second indicator is attached to the data as a first field in a data portion of the payload.

29. An apparatus for wireless communication, comprising:
means for generating packets, wherein each of the packets comprises a packet header comprising a packet format field comprising a first indicator that indicates one of first, second, and third states,
wherein the first state indicates the packet having no payload length field and no payload present,
wherein the second state indicates the packet having no payload length field and a payload comprising a default payload length, and
wherein the third state indicates the packet having a payload length field and a payload comprising a length defined by the payload length field; and
means for transmitting each of the packets.

30. The apparatus of claim 29, wherein the packets comprise variable length packets.

31. The apparatus of claim 29, wherein each of the packets generated with the first indicator indicating no payload length field in the packet header comprises a default length.

32. The apparatus of claim 29, wherein each of the packets comprises a preamble header comprising one or more repetitions of a pulse sequence.

33. The apparatus of claim 32, wherein the preamble header comprises a delimiter that indicates a start of the packet header that further comprises a sequence related to the pulse sequence.

34. The apparatus of claim 29, wherein the packet header is coded in $1/15$ repetition code.

35. The apparatus of claim 29, wherein when one or more of the packets comprise a payload, the payload comprises a payload control field comprising:
a packet type subfield configured to indicate a packet type;
a packet security key identification (ID) subfield;
a transmitter address format subfield; and
a packet acknowledgement request subfield.

36. The apparatus of claim 35, wherein the packet type subfield indicates one of first, second, and third types,
wherein the first type is a data packet,
wherein the second type is a supervisory packet, and
wherein the third type is a control packet.

37. The apparatus of claim 36, wherein when packet type is the second type, then a data portion indicates one of first, second, and third subtypes,
wherein the first subtype is a NULL-DATA packet,
wherein the second subtype is an ACK packet, and
wherein the third subtype is a KEEP_ALIVE packet.

38. The apparatus of claim 29, wherein when one or more of the packets comprise a payload, the payload comprises a sequence number field and a transmitter address field.

39. The apparatus of claim 29, wherein when one or more of the packets comprise a payload, the payload comprises at least one of a MIC (Message Integrity Code) field and a CRC (Cyclic Redundancy Check) field, and the payload is modulated by $1/4$ convolutional code plus (63,55) Reed-Solomon (RS) code.

40. The apparatus of claim 29, further comprising:
means for generating a second indicator based on a type of data in the payload; and
means for attaching the second indicator to the data.

41. The apparatus of claim 40, wherein the second indicator comprises an 8-bit control message identifier (CMID).

42. The apparatus of claim 41, wherein the second indicator is attached to the data as a first field in a data portion of the payload.

43. A computer program product, comprising:
a non-transitory computer-readable medium comprising code executable by an apparatus to:
generate packets, wherein each of the packets comprises a packet header comprising a packet format field comprising a first indicator that indicates one of first, second, and third states,
wherein the first state indicates the packet having no payload length field and no payload present,
wherein the second state indicates the packet having no payload length field and a payload comprising a default payload length, and
wherein the third state indicates the packet having a payload length field and a payload comprising a length defined by the payload length field; and
transmit each of the packets.

44. The computer program product of claim 43, wherein the non-transitory computer-readable medium further comprises code executable by the apparatus to:
generate a second indicator based on a type of data in the payload; and
attach the second indicator to the data.

45. A mobile communication device, comprising:
a packet generator configured to generate packets, wherein each of the packets comprises a packet header comprising a packet format field comprising a first indicator that indicates one of first, second, and third states,
wherein the first state indicates the packet having no payload length field and no payload present,
wherein the second state indicates the packet having no payload length field and a payload comprising a default payload length, and
wherein the third state indicates the packet having a payload length field and a payload comprising a length defined by the payload length field;
an antenna; and
a transmitter configured to transmit each of the packets through the antenna.

46. The mobile communication device of claim 45, wherein the packet generator is further configured to generate a second indicator based on a type of data in the payload, and attach the second indicator to the data.

* * * * *